(12) United States Patent
Washino et al.

(10) Patent No.: US 8,177,254 B2
(45) Date of Patent: May 15, 2012

(54) VEHICLE AIRBAG DEVICE

(75) Inventors: Shigeru Washino, Toyota (JP); Kenji Imamura, Kosai (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 46 days.

(21) Appl. No.: 12/812,639

(22) PCT Filed: Jan. 22, 2009

(86) PCT No.: PCT/IB2009/000091
§ 371 (c)(1),
(2), (4) Date: Jul. 13, 2010

(87) PCT Pub. No.: WO2009/095754
PCT Pub. Date: Aug. 6, 2009

(65) Prior Publication Data
US 2010/0289253 A1 Nov. 18, 2010

(30) Foreign Application Priority Data
Jan. 29, 2008 (JP) .................................. 2008-017857

(51) Int. Cl.
*B60R 21/203* (2006.01)
(52) U.S. Cl. .................................................... 280/728.3
(58) Field of Classification Search ............... 280/728.2, 280/728.3, 731, 743.1
See application file for complete search history.

(56) References Cited

U.S. PATENT DOCUMENTS
6,422,602 B1 7/2002 Ishii et al.
2001/0019203 A1* 9/2001 Igawa ........................... 280/731
2002/0084634 A1 7/2002 Adomeit et al.
2005/0236820 A1* 10/2005 Amamori ..................... 280/731

FOREIGN PATENT DOCUMENTS
| DE | 44 06 420 A1 | 9/1995 |
| DE | 195 02 744 C1 | 3/1996 |
| DE | 200 80 100 U1 | 5/2002 |
| DE | 200 80 100 UI | 5/2002 |
| DE | 600 10 008 T2 | 4/2005 |
| JP | A-47-21838 | 10/1972 |

(Continued)

OTHER PUBLICATIONS

International Search Report dated Jun. 4, 2009 in International Application No. PCT/IB2009/000091.
Office Action dated Feb. 13, 2012 issued in German Patent Application No. DE 11 2009 000 163.7 (with translation).
International Search Report dated Jun. 4, 2009 in International Application No. PCT/I132009/000091.

(Continued)

*Primary Examiner* — Paul N Dickson
*Assistant Examiner* — Robert A Coker
(74) *Attorney, Agent, or Firm* — Oliff & Berridge, PLC

(57) ABSTRACT

A vehicle airbag device has: a pad cover provided at the center of a steering wheel constituted of a spoke, a rim, and a hub and secured to the hub or to the spoke; an airbag that is provided, in a folded state, at the pad cover and deploys upon collision of the vehicle by tearing the pad cover to restrain a vehicle occupant; and an inflator secured to the hub or to the spoke to supply inflation gas into the airbag upon collision of the vehicle. The pad cover has an extension portion extending from the center of the steering wheel to the rim such that the extension portion overlaps the spoke. The extension portion has a tear portion that tears upon collision of the vehicle. A portion of the airbag is disposed, in a folded state, at the extension portion.

8 Claims, 26 Drawing Sheets

FOREIGN PATENT DOCUMENTS

| | | |
|---|---|---|
| JP | A-9-309395 | 12/1997 |
| JP | A-10-119700 | 5/1998 |
| JP | A-2000-85512 | 3/2000 |
| JP | A-200085512 | 3/2000 |
| JP | A-2001-277974 | 10/2001 |
| JP | 2006-027471 | 2/2006 |

OTHER PUBLICATIONS

Written Opinion of the International Searching Authority dated Jun. 4, 2009 in International Application No. PCT/IB2009/000091.

Office Action dated Nov. 18, 2009 in Japanese Patent Application No. 2008-017857 (with translation).

* cited by examiner

VEHICLE REAR SIDE

VEHICLE FRONT SIDE

VEHICLE REAR SIDE

22
VEHICLE FRONT SIDE

VEHICLE REAR SIDE

VEHICLE FRONT SIDE

VEHICLE REAR SIDE

222

VEHICLE FRONT SIDE

F I G . 32
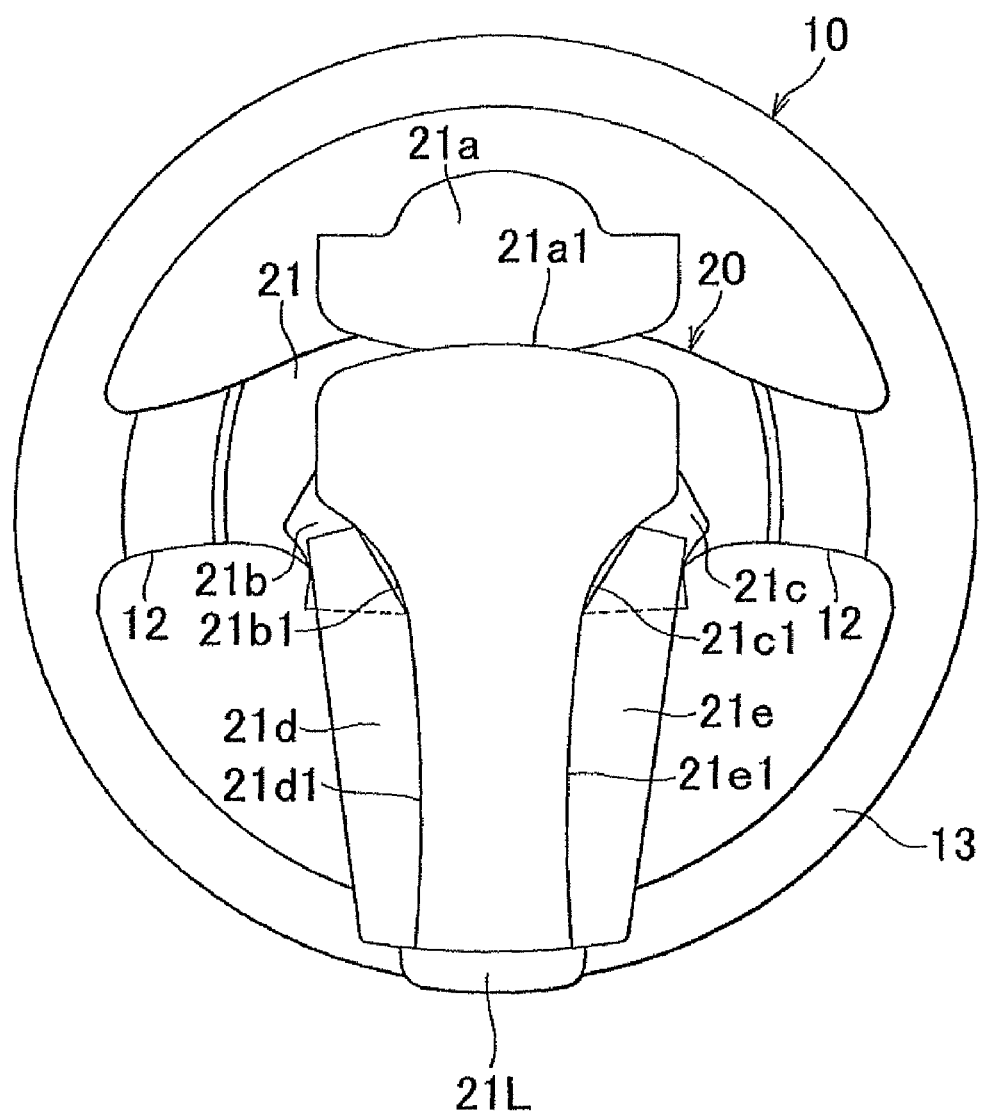

VEHICLE AIRBAG DEVICE

BACKGROUND OF THE INVENTION

1. Field of the Invention

The invention relates to a vehicle airbag device provided at a steering wheel of a vehicle. In particular, the invention relates to a vehicle airbag device having: a pad cover that is provided at the center of a steering wheel constituted of a spoke, a rim (ring portion), and a hub to which the rim is connected via the spoke, and that is secured to the hub or to the spoke; an airbag that is disposed, in a folded state, in the pad cover and deploys upon collision of the vehicle by tearing the pad cover and thus restrains a vehicle occupant; and an inflator that is secured to the hub or to the spoke and supplies inflation gas into the airbag upon collision of the vehicle.

2. Description of the Related Art

According to a vehicle airbag device of this kind, upon collision of the vehicle, the airbag tears an end wall of the pad cover on the rear side of the vehicle (the occupant side) and deploys toward the occupant. Thus, if the interval between the rim of the steering wheel and the occupant is small, it is difficult for the airbag to deploy between the air bag and the rim of the steeling wheel.

Japanese Patent Application Publication No. 2001-277974 (JP-A-2001-277974) describes a vehicle airbag device having an airbag constituted of a bag body the outline of which is, in the inflated state of the airbag, generally circular as viewed from the occupant and a flow-control cloth provided in the bag body so as to control the flow of the inflation gas supplied from the inflator to the inside of the bag body. The flow-control cloth is formed so as to facilitate the deployment of the airbag between the rim of the steering wheel and the occupant upon collision of the vehicle.

According to the vehicle airbag device described in JP-A-2001-277974, however, because the folded airbag is disposed at the center portion of the steering wheel and the tear portions of the pad cover are located at the center of the steering wheel, the distance the airbag needs to travel before reaching a target portion between the rim of the steering wheel and the occupant is substantially equal to that in conventional airbag devices, and thus the airbag deployment inevitably takes a certain time, and therefore the airbag may fail to deploy between the rim and the occupant smoothly.

SUMMARY OF THE INVENTION

An aspect of the invention relates to a vehicle airbag device, having: a pad cover that is provided at the center of a steering wheel constituted of a spoke, a rim, and a hub to which the rim is connected via the spoke and that is secured to the hub or to the spoke; an airbag that is provided, in a folded state, at the pad cover and deploys upon collision of the vehicle by tearing the pad cover and thus restrains a vehicle occupant; and an inflator that is secured to the hub or to the spoke and supplies inflation gas into the airbag upon collision of the vehicle. According to this vehicle airbag device, the pad cover has an extension portion extending from the center of the steering wheel to the rim of the steering wheel such that the extension portion overlaps the spoke as viewed from the vehicle occupant, the extension portion of the pad cover has a tear portion that tears upon collision of the vehicle, and a portion of the airbag is disposed, in a folded state, at the extension portion of the pad cover.

According to the vehicle airbag device described above, the pad cover has the extension portion that extends to the rim such that it overlaps, as viewed from the vehicle occupant, the spoke extending from the hub toward the vehicle occupant, and the extension portion has the tear portion that tears upon collision of the vehicle and a portion of the airbag is disposed, in a folded state, at the extension portion of the pad cover. Therefore, upon collision of the vehicle, the portion of the airbag disposed at the extension portion of the pad cover, tears the tear portion at the extension portion and then starts deploying from a portion of the rim close to the vehicle occupant. As such, the distance that said portion of the airbag needs to travel before reaching a target position between the rim of the steering wheel and the vehicle occupant is short as compared to conventional airbag devices, and thus said portion of the airbag can deploy between the rim of the steering wheel and the vehicle occupant quickly (in a short time).

According to the vehicle airbag device described above, therefore, even in a case where the distance between the rim of the steering wheel and the vehicle occupant is short, the airbag smoothly deploys between the rim of the steering wheel and the vehicle occupant, that is, the deployment of the airbag can proceed sufficiently or can be completed by the time the vehicle occupant starts moving toward the rim of the steering wheel, and therefore the vehicle occupant can be reliably prevented from hitting the rim of the steering wheel.

The vehicle airbag device described above may further have a diffuser that is provided in the airbag so as to guide a portion of the inflation gas supplied from the inflator to the portion of the airbag disposed at the extension portion of the pad cover. According to this structure, a portion of the inflation gas supplied from the inflator into the airbag is guided via the diffuser to the portion of the airbag disposed at the extension portion of the pad cover, and therefore the portion of the airbag disposed in the extension portion of the pad cover deploys quickly, and accurately.

Further, the vehicle airbag device described above may be such that the airbag is folded such that no creases are formed at a side of the airbag to which the inflation gas is supplied from the inflator, and a portion of the crease-free portion of the airbag is disposed at the extension portion of the pad cover. According to this structure, as the inflation gas supplied from the inflator enters the folded airbag, the inflation gas flows straight along the inner face of the creases-free side of the airbag. Thus, the inflation gas supplied from the inflator flows quickly to the portion of the airbag disposed at the pad cover without being interfered with any crease.

Further, the vehicle airbag device described above may be such that the tear portion extends to the rim. According to this structure, the portion of the airbag disposed at the extension portion of the pad cover deploys beyond the rim of the steering wheel and gets between the rim and the vehicle occupant, and therefore the time needed for said portion of the airbag to deploy between the rim of the steering wheel and the vehicle occupant decreases.

Further, the vehicle airbag device described above may be such that: the extension portion of the pad cover overlaps a portion of the rim of the steering wheel; the tear portion at the extension portion extends to where the extension portion overlaps the rim; and a concave portion is formed at the rim of the steering wheel and a portion of the airbag is disposed in the concave portion. According to this structure, the portion of the airbag disposed in the concave portion formed at the rim deploys between the rim of the steering wheel and the vehicle occupant. Therefore, the distance the portion of the airbag needs to travel before reaching the vehicle occupant upon deployment is short, and therefore the time needed for the airbag to deploy between the rim and the vehicle occupant further decreases.

Further, the vehicle airbag device described above may further have a bag retainer that is arranged such that a portion of the airbag is sandwiched between the bag retainer and the inflator and a portion of the bag retainer may extend from the center of the steering wheel to the rim along the spoke. According to this structure, the portion of the airbag disposed at the extension portion of the pad cover is arranged between the bag retainer and the spoke and thereby prevented from moving unnecessarily during its deployment and thus the airbag deploys in a stable manner. Further, the bag retainer serves also as a core when folding the airbag, and this facilitates the process for folding the airbag.

Further, the bag retainer maintains the shape of the folded airbag until it is attached to the steering wheel, and this facilitates the process for assembling the folded airbag, the pad cover, and other components into an airbag module. Further, in a case where the process for folding the airbag and the process for assembling the airbag module are performed at different places, the airbag can be reliably prevented from being unfolded accidentally during transportation.

Further, the vehicle airbag device described above may further have a bag holder that is provided outside of the airbag and on the vehicle front side of the air bag so as to hold the air bag and a portion of the bag holder may extend from the center of the steering wheel to the rim. According to this structure, the bag holder maintains the shape of the folded airbag until it is attached to the steering wheel, and this facilitates the process for assembling the folded airbag, the pad cover, and other components into an airbag module. Further, in a case where the process for folding the airbag and the process for assembling the airbag module are performed at different places, the airbag can be reliably prevented from being unfolded accidentally during transportation.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 32 is a front view showing a state where the tear portions of the pad cover shown in FIG. 31 have all deployed;

DETAILED DESCRIPTION OF THE EMBODIMENTS

Figure 1:
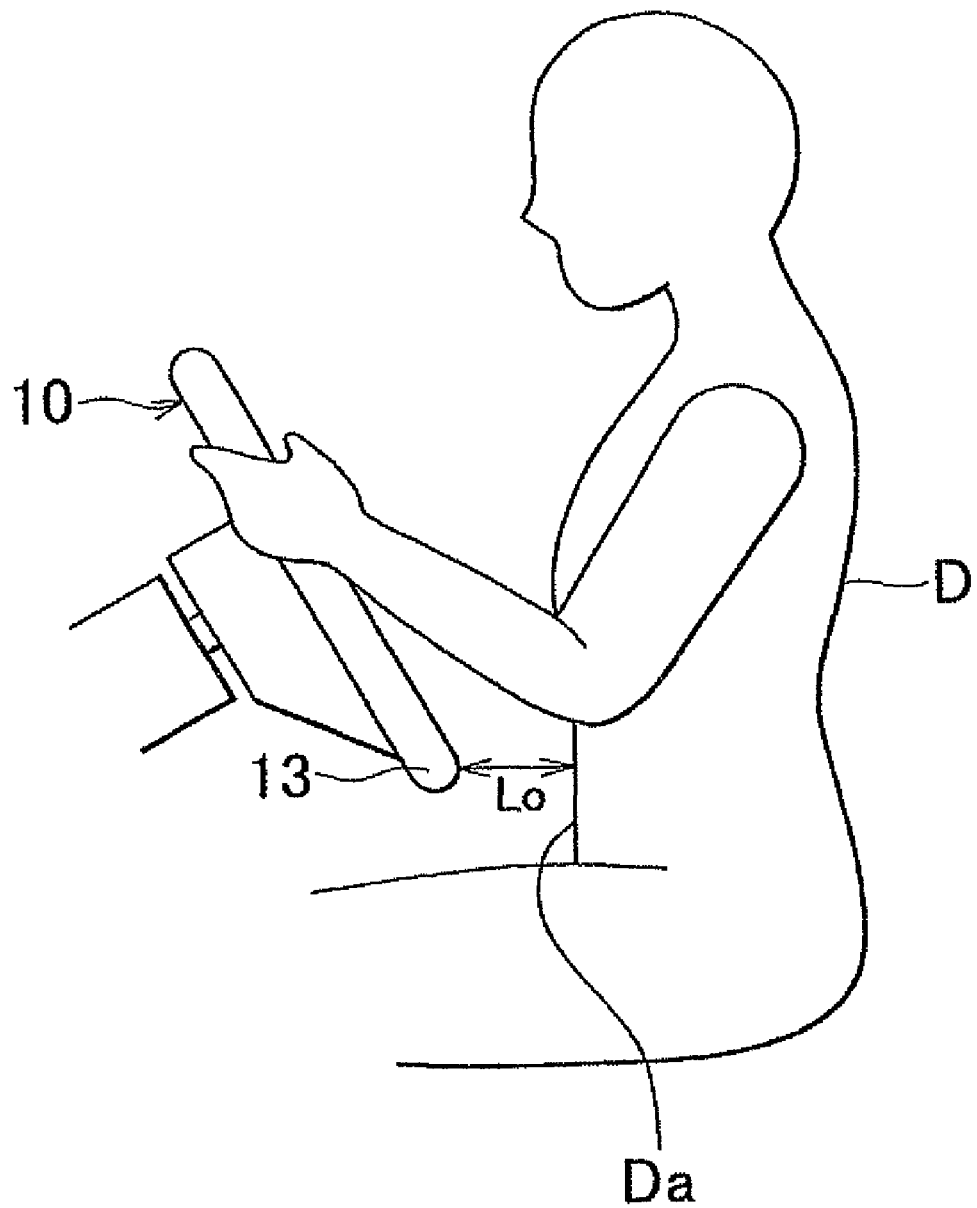
FIG. 1 is a view illustrating a steering wheel incorporating a vehicle airbag device according to the first example embodiment of the invention and a driver of the vehicle.

Hereinafter, example embodiments of the invention will be described with reference to the accompanying drawings. FIG. 1 to FIG. 17 show a vehicle airbag device 20 according to the first example embodiment of the invention. The vehicle airbag device 20 is provided at the center of a steering wheel 10 that is circular. As shown in FIG. 1, the steering wheel 10 is provided before a driver D of the vehicle and tilted by a given amount, and therefore the lower end of a rim 13 of the steering wheel 10 is closer to a body Da of the driver D than the upper end of the rim 13 is.

Figure 2:
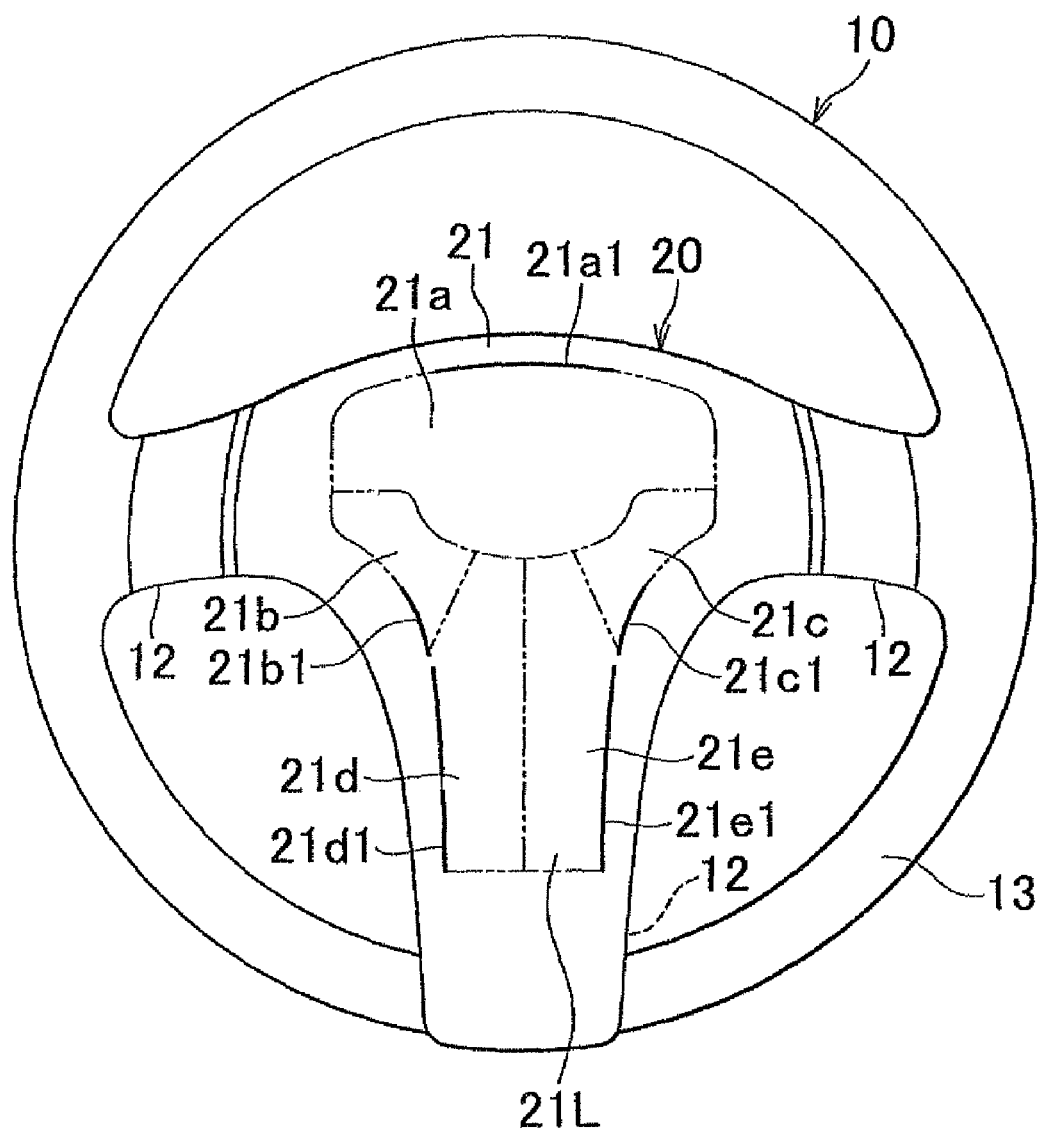
FIG. 2 is a front view of the vehicle airbag device of the first example embodiment of the invention.
Figure 3:
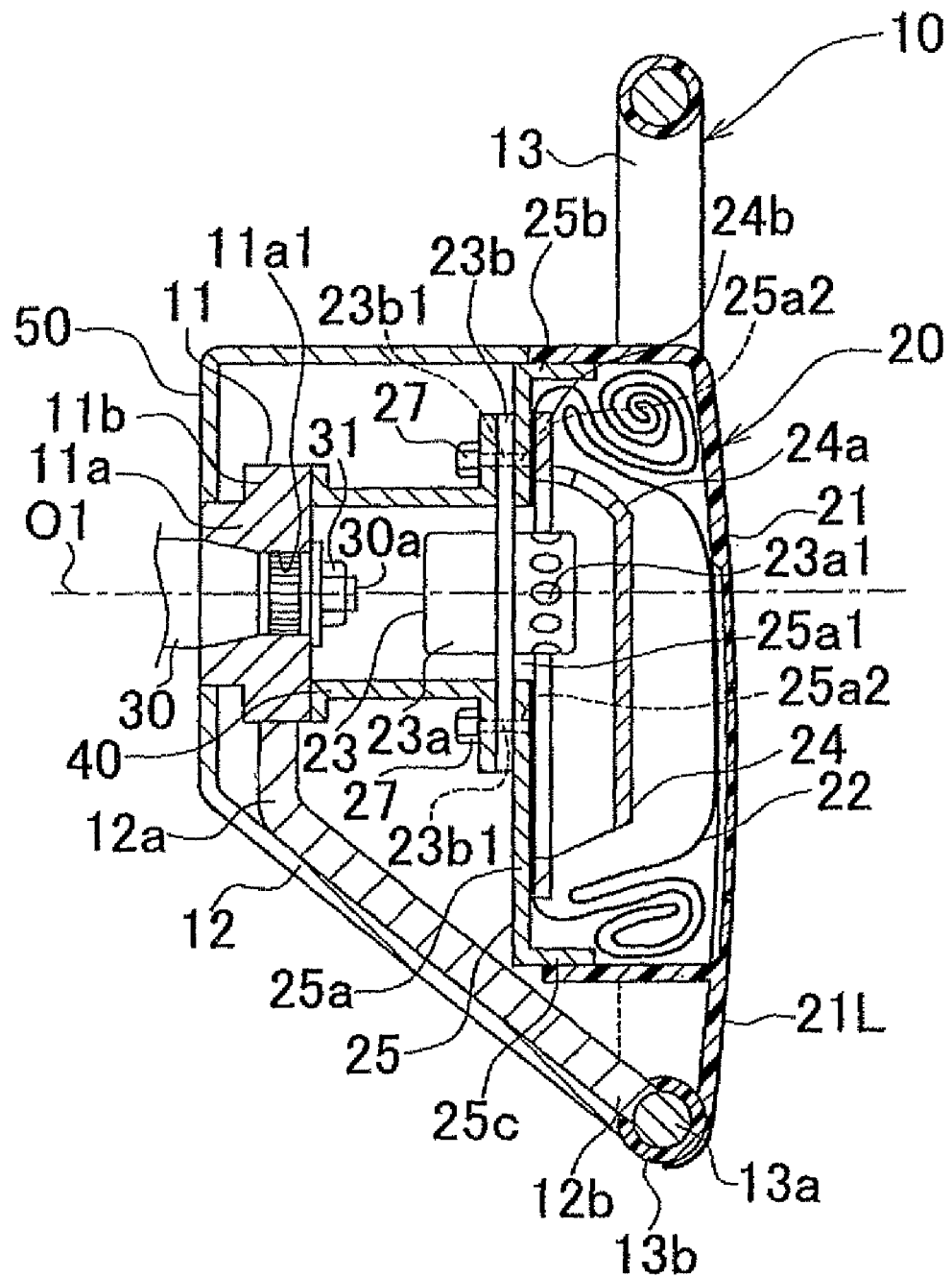
FIG. 3 is an enlarged cross-sectional view cutting vertically through the center of the vehicle airbag device shown in FIG. 2.

Referring to FIG. 2 and FIG. 3, the steering wheel 10 has a hub 11 coupled with a steering main shaft 30 using a nut 31, three spokes 12 each secured to the hub 11 via an end portion 12a (the inner end portion of each spoke 12 in the radial direction of the steering wheel 10), and a rim 13 secured to an end portion 12b of each spoke 12 (the outer end portion of each spoke 12 in the radial direction of the steering wheel 10) and coaxial with the steering main shaft 30.

Referring to FIG. 3, the hub 11 has a cylindrical portion 11a coupled with the steering main shaft 30 such that torque can be transferred therebetween and a flange portion 11b integrally formed on the outer periphery of the cylindrical portion 11a on the rear side of the vehicle. The cylindrical portion 11a has a through hole 11a1 into which the steering main shaft 30 is inserted, and thus the cylindrical portion 11a is coupled with the upper end of the steering main shaft 30 (the end of the steering main shaft 30 on the rear side of the vehicle) via the through hole 11a1 such that torque can be transferred therebetween. The cylindrical portion 11a is retained by the nut 31 tightened to an upper thread 30a of the steering main shaft 30.

The end portion 12a of each spoke 12 is secured to the outer periphery of the flange portion 11b of the hub 11 and each spoke 12 extends radially outward. The end portion 12b of each spoke 12 is secured to the inner periphery of the rim 13. The rim 13 is ring-shaped and is connected to the hub 11 via the three spokes 12. The rim 13 is rotatable about the rotation center O1 of the steering main shaft 30 together with the spokes 12 and the hub 11. The rim 13 is constituted of a core 13a to which the outer ends of the spokes 12 are secured and a resin 13b covering the core 13a.

Referring to FIG. 2 and FIG. 3, the vehicle airbag device 20 has a pad cover 21, an airbag 22, an inflator 23, a diffuser 24, and a bag holder 25. Four stud bolts 26 (shown in FIG. 14 and FIG. 15) are fixed on the diffuser 24. Referring to FIG. 3, the vehicle airbag device 20 is attached to the hub 11 of the steering wheel 10 via a bracket 40. Attached to the front side of the hub 11 is a back cover 50 covering the backside of the vehicle airbag device 20.

The pad cover 21 is attached to the bag holder 25. That is, the pad cover 21 is attached to the hub 11 together with the bag holder 25, etc., via the bracket 40. As shown in FIG. 2 and FIG. 3, the pad cover 21 has an extension portion 21L. Formed on the driver side of the pad cover 21 are five tear portions 21a, 21b, 21c, 21d, and 21e that tear as the airbag 22 deploys upon collision of the vehicle. The extension portion 21L extends to the rim 13 such that, as viewed from the driver D, the extension portion 21L overlaps the lower spoke 12 (shown in the lower side in FIG. 2) extending from the hub 11 toward the driver D. The lower end portion of the extension portion 21L overlaps a portion of the rim 13 (a portion of the rim 13 extending a limited distance in the circumferential direction of the rim 13 and the entire distance in the radial direction of the rim 13).

The tear portion 21a is provided at a position corresponding to the upper side of the hub 11 as viewed in FIG. 2 and it tears along the tear lines indicated by the double-dotted lines in FIG. 2. When tearing, the tear portion 21a deploys upward by pivoting about a hinge portion 21a1 indicated by the bold line in FIG. 2. The tear portion 21b is provided at a position corresponding to the lower left side of the hub 11 as viewed in FIG. 2 and it tears along the tear lines indicated by the double-dotted lines in FIG. 2. When tearing, the tear portion 21b deploys toward the bottom left by pivoting about a hinge portion 21b1. The tear portion 21c is provided at a position corresponding to the lower right side of the hub 11 as viewed in FIG. 2 and it tears along the tear lines indicated by the double-dotted lines in FIG. 2. When tearing, the tear portion 21c deploys toward the bottom right by pivoting about a hinge portion 21c1.

The tear portion 21d is provided over the area covering, as viewed in FIG. 2, the left half of the lower center portion of the hub 11 to the left side of the extension portion 21L of the pad cover 21, and it tears along the tear lines indicated by the double-dotted lines in FIG. 2. When tearing, the tear portion 21d deploys to the left side by pivoting about a hinge portion 21d1. The tear portion 21e is provided over the area covering, as viewed in FIG. 2, the right half of the lower center portion of the hub 11 to the right side of the extension portion 21L of the pad cover 21, and it tears along the tear lines indicated by the double-dotted lines in FIG. 2. When tearing, the tear portion 21e deploys to the right side by pivoting about a hinge portion 21e1.

Figure 4:
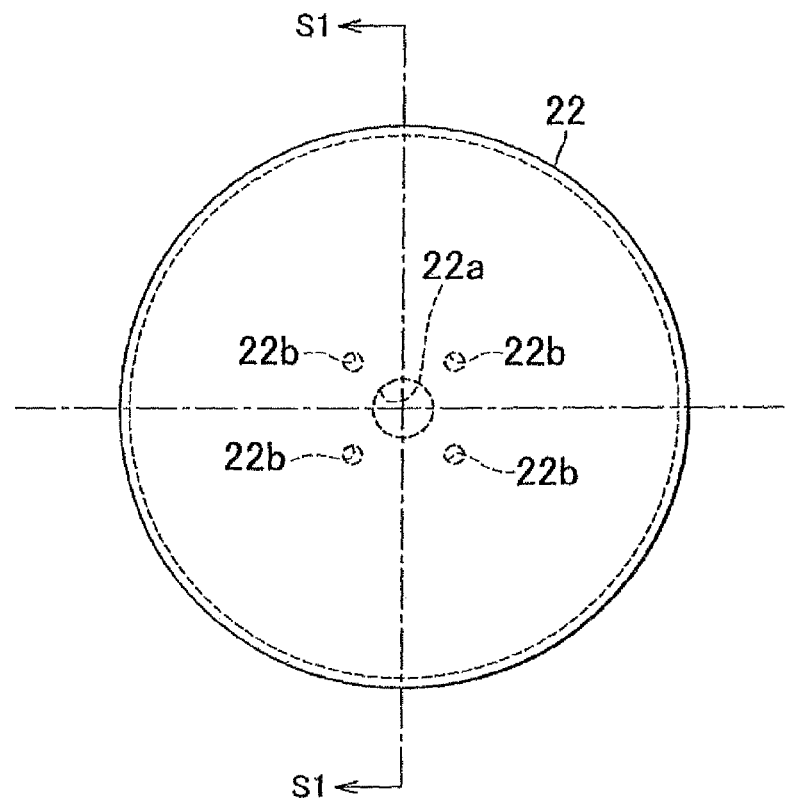
FIG. 4 is a view of the airbag of the vehicle airbag device shown in FIG. 3 when it is viewed from the rear side of the vehicle.
Figure 5:
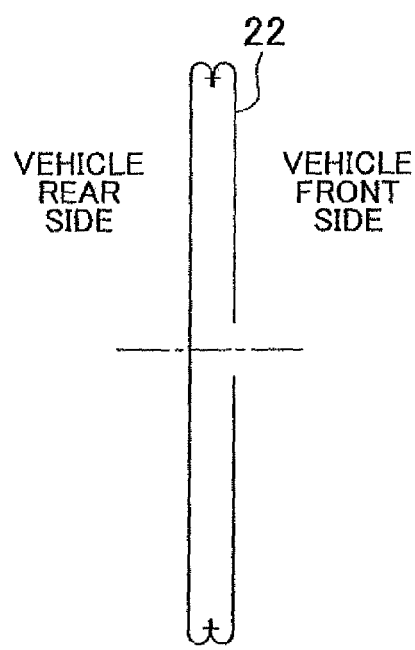
FIG. 5 is a cross-sectional view of the airbag taken along S1-S1 in FIG. 4.

Referring to FIG. 4 and FIG. 5, the airbag 22 is formed by overlapping two generally circular cloths and weaving their outer peripheral edges together. The cloth on the front side of the vehicle has an insert hole 22a through which a body 23a of the inflator 23 is inserted into the airbag 22 and insert holes 22b into which the respective stud bolts 26 are inserted. Further, the airbag 22 is folded into a given form through the processes schematically shown in FIG. 6 to FIG. 13 (illustrating a method for folding the airbag 22) and then set at the pad cover 21. Then, the pad cover 21 is secured to the bracket 40 together with the inflator 23, the diffuser 24, the bag holder 25, and so on, using the stud bolts 26 and nuts 27. Note that the stud bolts 26 are welded to the diffuser 24 in advance.

Figure 6:
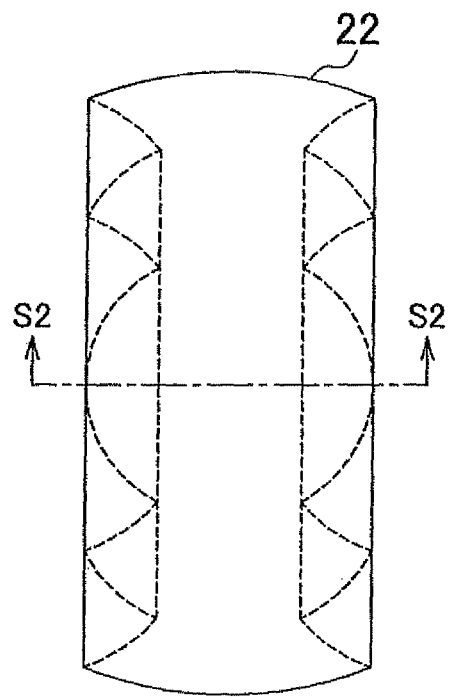
FIG. 6 is a front view of the airbag shown in FIG. 4 when the left and right portions have been rolled toward the front side of the vehicle.
Figure 7:
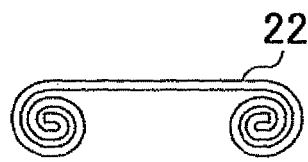
FIG. 7 is a cross-sectional view of the airbag taken along S2-S2 in FIG. 6.
Figure 8:
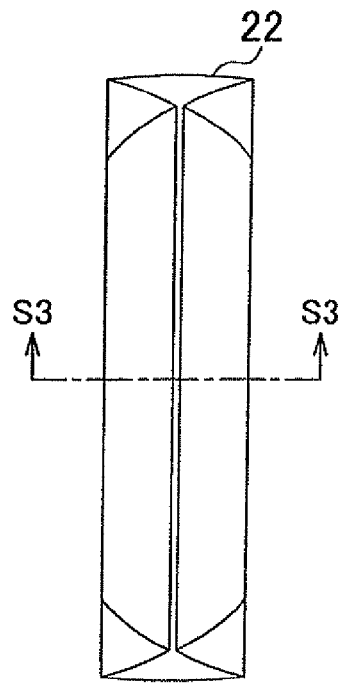
FIG. 8 is a front view of the airbag shown in FIG. 6 when the left and right portions have been folded back toward the rear side of the vehicle.
Figure 9:
FIG. 9 is a cross-sectional view of the airbag taken along S3-S3 in FIG. 8.

FIG. 6 and FIG. 7 illustrate a state where the left and right portions of the airbag 22 shown in FIG. 4 have been rolled toward the front side of the vehicle. In this state of the airbag 22, no creases are present at the side of the airbag 22 on the rear side of the vehicle. FIG. 8 and FIG. 9 illustrate a state where the left and right portions of the airbag 22 shown in FIG. 6 have been folded back toward the rear side of the vehicle. In this state of the airbag 22, no creases are present at the side of the airbag 22 on the front side of the vehicle.

Figure 10:
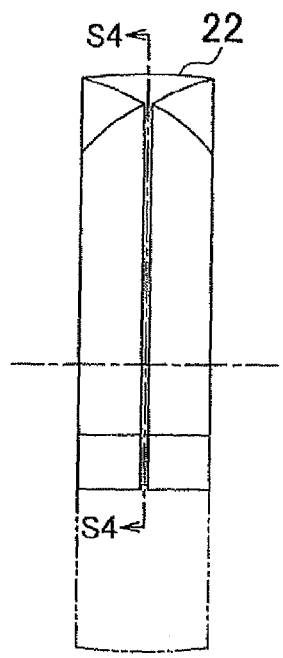
FIG. 10 a front view of the airbag shown in FIG. 8 when a substantially lower half of the airbag has been rolled toward the front side of the vehicle and then folded back toward the rear side of the vehicle.
Figure 11:
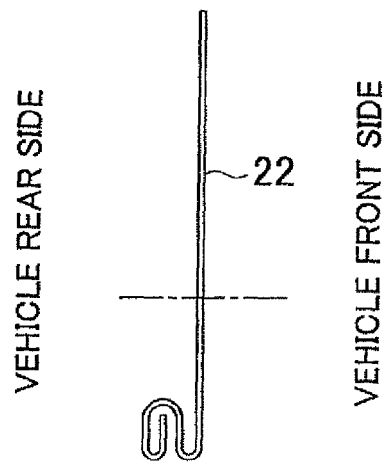
FIG. 11 is a cross-sectional view of the airbag taken along S4-S4 in FIG. 10.
Figure 12:
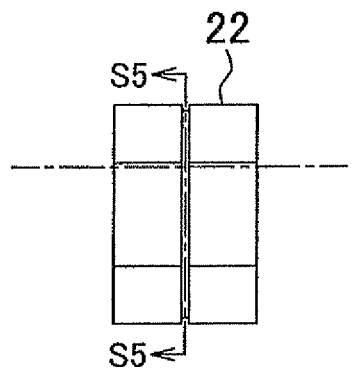
FIG. 12 is a front view of the airbag shown in FIG. 10 when the upper portion of the airbag has been rolled toward the front side of the vehicle and then folded back toward the rear side of the vehicle.
Figure 13:
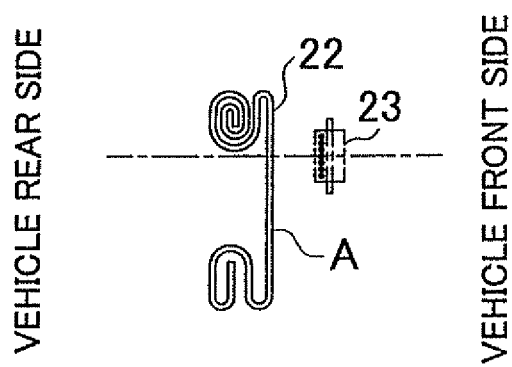
FIG. 13 is a cross-sectional view of the airbag taken along S5-S5 in FIG. 12.

FIG. 10 and FIG. 11 illustrates a state where a substantially lower half of the airbag 22 shown in FIG. 8 has been rolled toward the front side of the vehicle and then folded back toward the rear side of the vehicle. In this state of the airbag 22, no creases are present at the side of the airbag 22 on the front side of the vehicle. FIG. 12 and FIG. 13 illustrate a state where the upper portion (the portion extending upward from the center) of the airbag 22 shown in FIG. 10 has been rolled toward the front side of the vehicle and then folded back toward the rear side of the vehicle. In this state of the airbag 22, no creases are present at the side of the airbag 22 on the front side of the vehicle.

When the airbag 22 is in the state shown in FIG. 12 and FIG. 13, the lower portion of the airbag 22 extending downward from the center portion to which the inflator 23 is attached (indicated by the single-dotted line in FIG. 13) is longer, in the vertical direction, than the upper portion of the airbag 22 extending upward from the center portion by a given amount (i.e., the airbag 22 appears to be a vertically long rectangle as viewed from the driver). In a state where the airbag 22 is set in the pad cover 21, the lower end of the airbag 22 is disposed, in a folded state, in the extension portion 21L of the pad cover 21. Note that no creases are present at the side of the airbag 22 to which inflation gas is supplied from the inflator 23, that is, the side A on the front side of the vehicle.

Referring to FIG. 3, the inflator 23 has the body 23a that is generally cylindrical and produces inflation gas upon collision of the vehicle and an annular flange portion 23b provided on the center of the outer peripheral face of the body 23a. The body 23a has a plurality of gas discharge holes 23a1 that are formed in the outer peripheral face of the rear portion of the body 23a at even intervals in the circumferential direction. Through the gas discharge holes 23a1, the inflation gas is discharged radially outward. That is, upon collision of the vehicle, the inflation gas is discharged into the airbag 22 via the gas discharge holes 23a1. Through holes 23b1 are formed at the upper portion, the lower portion, the left portion, the right portion of the flange portion 23b, respectively, and the stud bolts 26 are inserted into the respective through holes 23b1. Thus, the flange portion 23b is secured to the bracket 40 using the stud bolts 26 and nuts 27.

Figure 14:
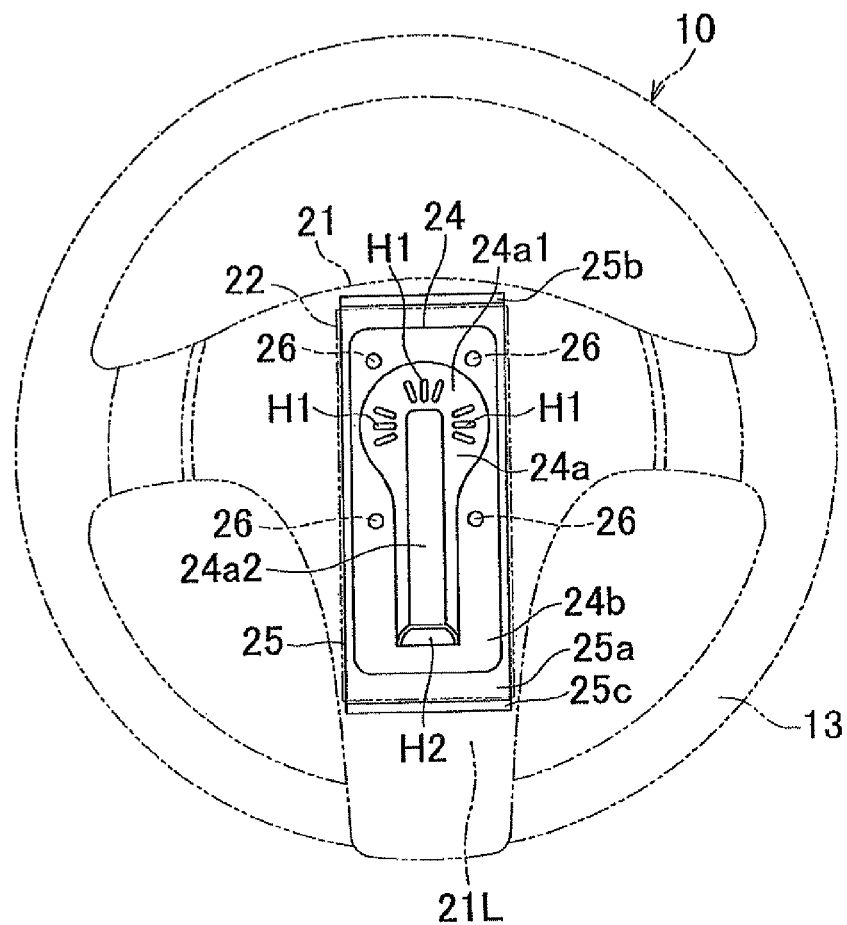
FIG. 14 is a view in which the diffuser and the back holder shown in FIG. 3 are indicated by solid lines and the steering wheel and the pad cover shown in FIG. 2 are indicated by dotted lines.
Figure 15:
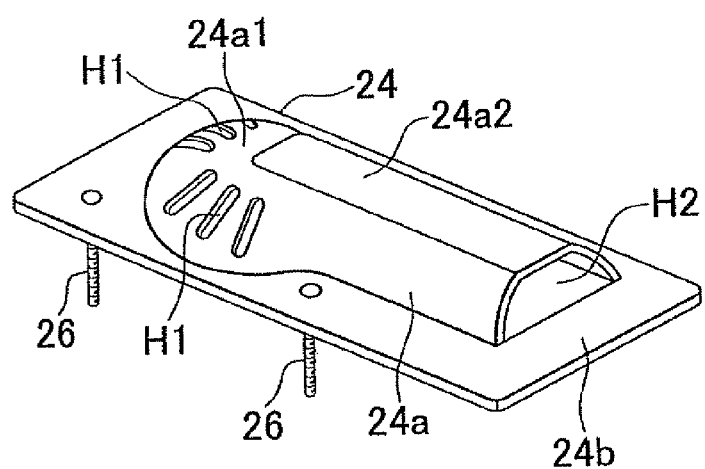
FIG. 15 is a perspective view schematically showing the diffuser in FIG. 3 and FIG. 14.

Referring to FIG. 3, FIG. 14, and FIG. 15, the diffuser 24 has an overhanging portion 24a and a flange portion 24b, and the diffuser 24 is set in the airbag 22. The overhanging portion 24a is constituted of a doom-shaped overhanging portion 24a1 in which the rear portion of the body 23a of the inflator 23 is disposed and a straight overhanging portion 24a2 that extends straight from the doom-shaped overhanging portion 24a1 to the lower end of the airbag 22 disposed in the extension portion 21L of the pad cover 21.

Referring to FIG. 14, three through holes H1 are formed in each of the upper portion, the left portion, and the right portion of the doom-shaped overhanging portion 24a1, and the inflation gas discharged from the inflator 23 (excluding part of said gas) is supplied dispersedly to the center portion of the airbag 22 via these through holes H1. On the other hand, referring to FIG. 14, a through hole H2 is formed at the lower end of the straight overhanging portion 24a2, and part of the inflation gas discharged from the inflator 23 is supplied via the through hole H2 to the portion of the airbag 22 disposed in the extension portion 21L of the pad cover 21.

The flange portion 24b has a generally rectangular outline and surrounds the overhanging portion 24a. Four stud bolts 26 are fixed to the portion of the flange portion 24b around the doom-shaped overhanging portion 24a1. The flange portion 24b is flat, and the airbag 22 is partially sandwiched between the flange portion 24b and a flat portion 25a of the bag holder 25.

Referring to FIG. 3, the bag holder 25 has the flat portion 25a and a pair of bent portions 25b, 25c, and the bag holder 25 is arranged outside of the airbag 22. Referring to FIG. 14, the flat portion 25a is larger in size than the flange portion 24b of the diffuser 24 and has, as shown in FIG. 3, a through hole 25a1 via which the rear portion of the body 23a of the inflator 23 is inserted into the airbag 22 and through holes 25a2 into which the stud bolts 26 are inserted. The bent portions 25b, 25e are bent toward the rear side of the vehicle from the flat portion 25a and connected to the pad cover 21 using given connecting means, such as rivets (not shown in the drawings).

Figure 16:
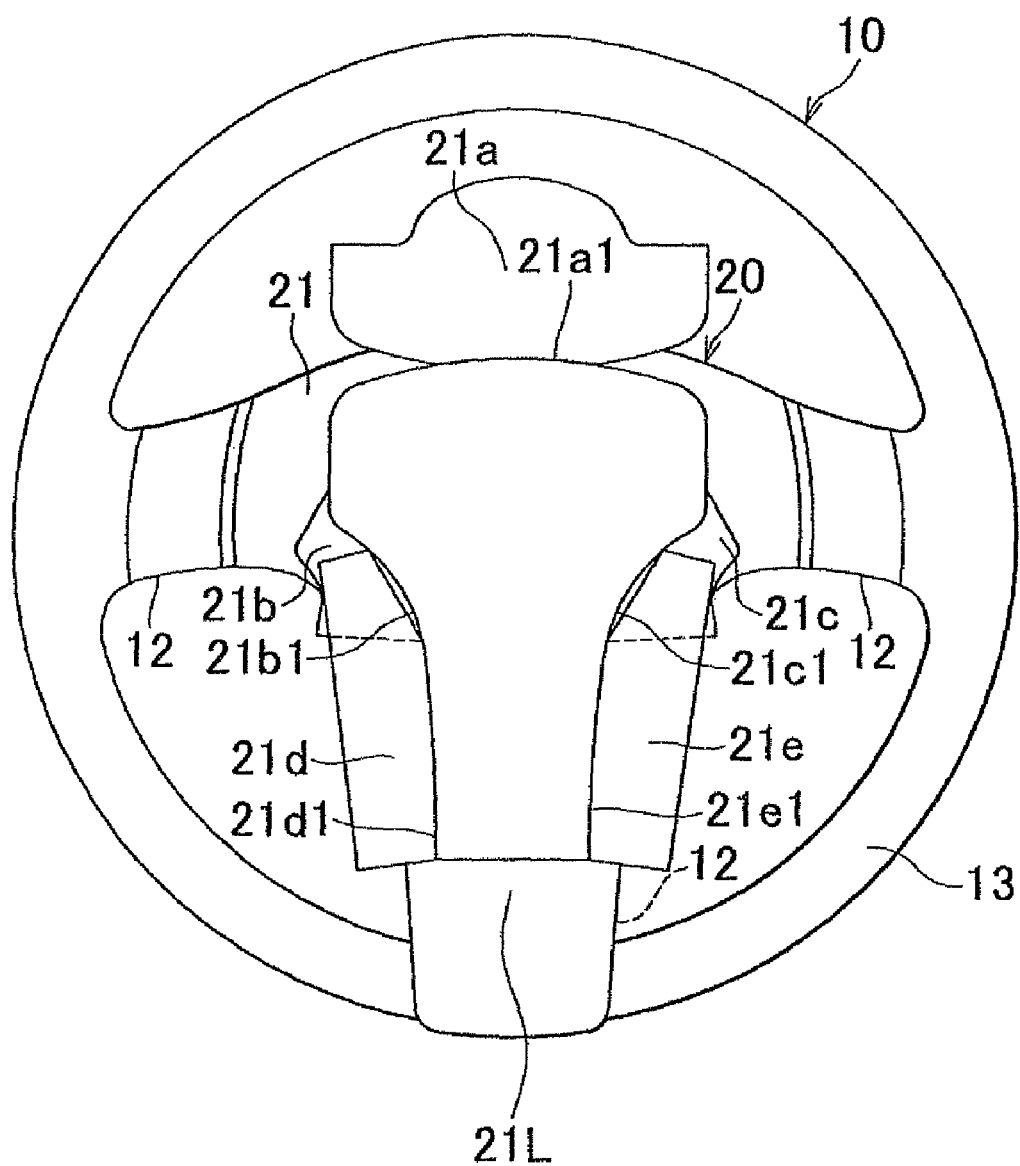
FIG. 16 is a front view of the steering wheel when the tear portions of the pad cover have all deployed.
Figure 17:
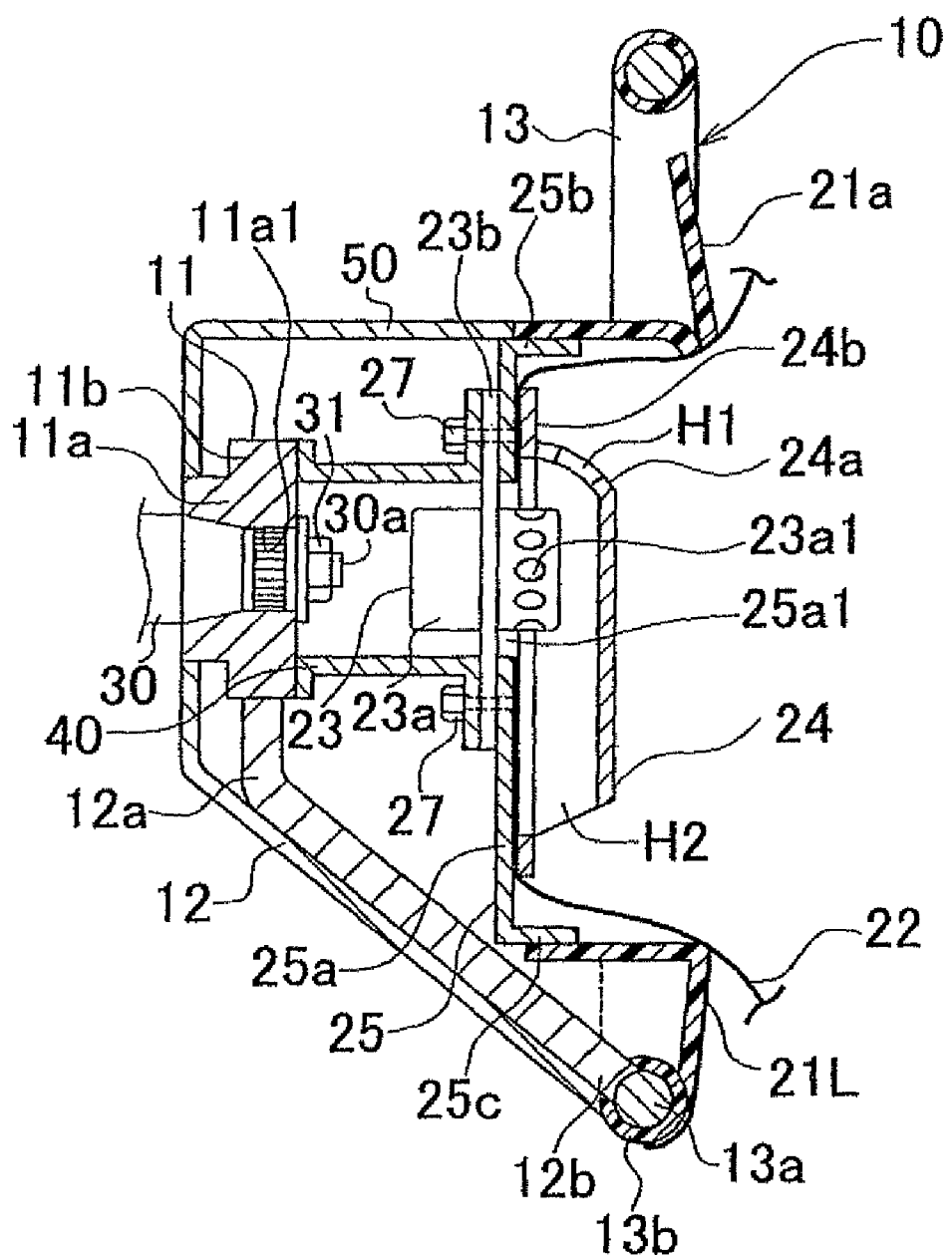
FIG. 17 is a view illustrating a state where the airbag of the vehicle airbag device of the first example embodiment has started deploying.

According to the above-described airbag device of the first example embodiment, upon collision of the vehicle, the inflation gas is supplied from the inflator 23 to the airbag 22, inflating the airbag 22 to deploy toward the occupant. At this time, the five tear portions 21a, 21b, 21c, 21d, and 21e tear along the respective tear lines and deploy as shown in FIG. 16.

According to the vehicle airbag device of the first example embodiment, the pad cover 21 has the extension portion 21L, extending to the rim 13 such that, as viewed from the driver, the extension portion 21L overlaps the lower spoke 12 extending from the hub 11 toward the driver D, and the extension portion 21L has the tear portions 21d, 21e that tear upon collision of the vehicle (as the airbag 22 deploys) and a portion of the airbag 22 is disposed, in a folded state, in the extension portion 21L of the pad cover 21.

Thus, if the vehicle collides with something when it is running straight, the portion of the airbag 22 disposed in the extension portion 21L of the pad cover 21 tears the tear portions 21d, 21e provided at the extension portion 21L of the pad cover 21, and it starts deploying from near the driver D. As such, the distance this portion of the airbag 22 needs to travel before reaching a target position between the rim 13 of the steering wheel 10 and the driver D is shorter than that in the conventional airbag devices, and therefore said portion of the airbag 22 can quickly deploy between the rim 13 and the driver D.

According to the structure described above, thus, even in a case where the distance Lo between the lower end of the rim 13 of the steering wheel 10 and the body Da of the driver D is short (refer to FIG. 1), when the vehicle collides with something while running straight, a portion of the airbag 22 smoothly deploys between the rim 13 of the steering wheel 10 and the body Da of the driver D, that is, the deployment of said portion of the airbag 22 can proceed sufficiently or can be completed by the time the driver D starts moving toward the rim 13, and therefore the driver D can be reliably prevented from hitting the rim 13.

According to the above-described airbag device of the first example embodiment, the diffuser 24 is provided in the airbag 22 and it guides a part of the inflation gas supplied from the inflator 23 to the portion of the airbag 22 disposed in the extension portion 21L of the pad cover 21. That is, a portion of the inflation gas supplied from the inflator 23 to the airbag 22 is guided via the diffuser 24 to the portion of the airbag 22 disposed in the extension portion 21L of the pad cover 21. As such, the portion of the airbag 22 disposed in the extension portion 21L of the pad cover 21 deploys accurately, and quickly.

According to the vehicle airbag device of the first example embodiment, further, because the airbag 22 is folded such that no creases are formed at the side A of the airbag 22 to which the inflation gas is supplied from the inflator 23 (the right side of the inflator 23 as viewed in FIG. 13), and a portion of the crease-free side of the airbag 22 is, disposed in the extension portion 21L of the pad cover 21, as the inflation gas supplied from the inflator 23 enters the folded airbag 22, the inflation gas flows straight along the side A where no creases are present. Therefore, the inflation gas supplied from the inflator 23 quickly flows to the portion of the airbag 22 disposed in the extension portion 21L of the pad cover 21 without being interfered with by any crease.

According to the vehicle airbag device of the first example embodiment of the invention, further, the bag holder 25 is provided outside of the airbag 22 between the flange portion 23b of the inflator 23 and the side of the airbag 22 on the front side of the vehicle to hold the folded air bag 22, and a portion of the bag holder 25 extends along the spoke 12 extending from the hub 11 toward the driver D. Therefore, the bag holder 25 maintains the shape of the folded airbag 22 until it is attached to the steering wheel 10, and this facilitates the process for assembling the folded airbag 22, the pad cover 21, and other components into an airbag module. Further, in a case where the process for folding the airbag 22 and the process for assembling the airbag module are performed at different places, the airbag 22 can be reliably prevented from being unfolded accidentally during transportation.

While the airbag 22 is folded through the processes schematically illustrated in FIG. 6 to FIG. 13 and then set in the pad cover 21 in the first example embodiment, the airbag may alternatively be folded through the processes schematically illustrated in FIG. 18 to FIG. 23 or through the processes schematically illustrated in FIG. 24 to FIG. 29 as described below.

Figure 18:
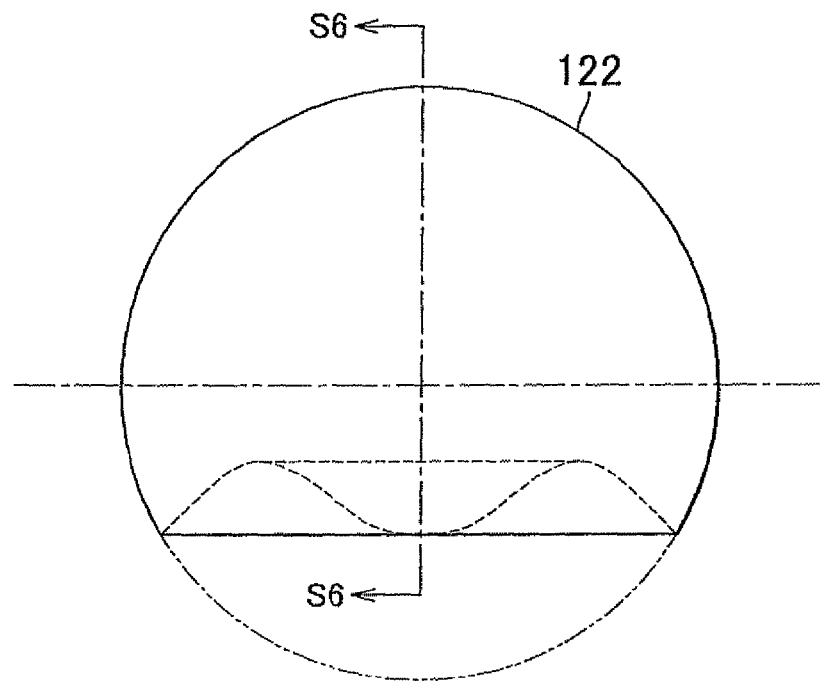
FIG. 18 is a front view of the airbag when a substantially lower half of the airbag has been tacked up toward the center portion of the airbag.
Figure 19:
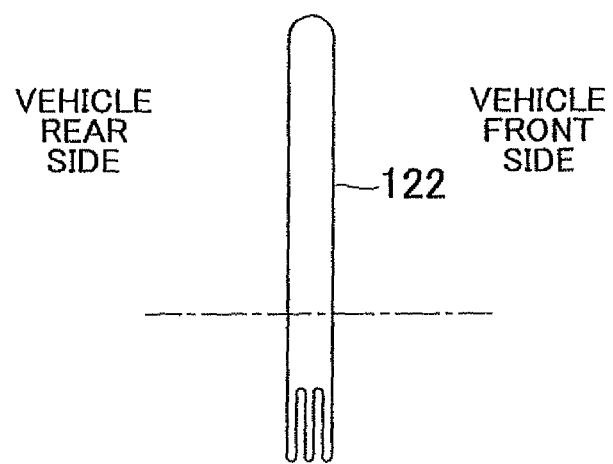
FIG. 19 is a cross-sectional view of the airbag taken along S6-S6 in FIG. 18.
Figure 20:
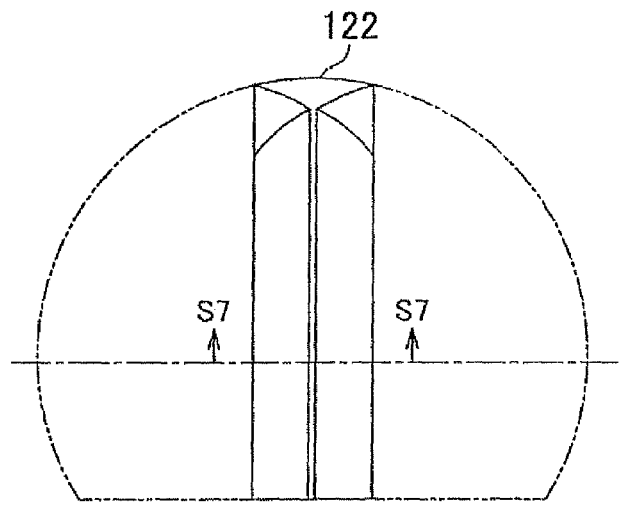
FIG. 20 is a front view of the airbag shown in FIG. 18 when the left and right portions have been rolled toward the front side of the vehicle and then folded back toward the rear side of the vehicle.
Figure 21:
FIG. 21 is a cross-sectional view of the airbag taken along S7-S7 in FIG. 20.
Figure 22:
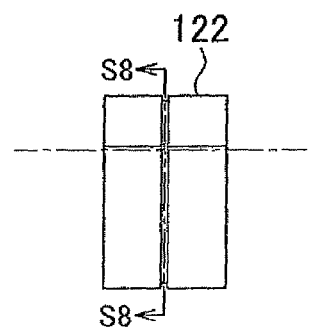
FIG. 22 is a front view of the airbag shown in FIG. 20 when the upper portion of the airbag has been rolled toward the front side of the vehicle and then folded back toward the rear side of the vehicle.
Figure 23:
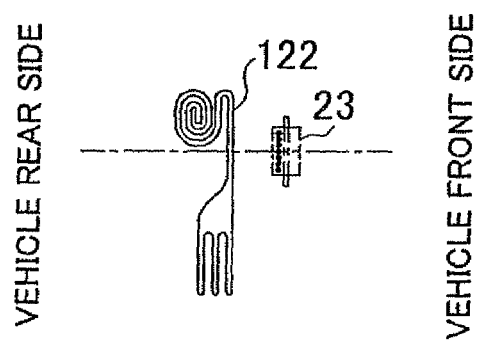
FIG. 23 is a cross-sectional view of the airbag taken along S8-S8 in FIG. 22.

FIG. 18 and FIG. 19 illustrate a state where a substantially lower half of an airbag 122 has been tucked up toward the center portion of the airbag 122. In this state of the airbag 122, creases are present only at the substantially lower half of the airbag 122. FIG. 20 and FIG. 21 illustrates a state where the left and right portions of the airbag 122 in the state shown in FIG. 18 have been rolled toward the front side of the vehicle and then folded back toward the rear side of the vehicle. In this state of the airbag 122, no creases are present at the side of the airbag 122 on the front side of the vehicle. FIG. 22 and FIG. 23 illustrate a state where the upper portion (the portion extending upward from the center portion) of the airbag 122 in the state shown in FIG. 20 has been rolled toward the front side of the vehicle and then folded back toward the rear side of the vehicle. In this state of the airbag 122, no creases are present at the side of the airbag 122 on the front side of the vehicle.

When the airbag 122 is in the state shown in FIG. 22 and FIG. 23, the lower portion of the airbag 122 extending downward from the center portion to which the inflator 23 is attached (indicated by the single-dotted line in FIG. 23) is longer, in the vertical direction, than the upper portion by a given amount (i.e., the airbag 122 appears to be a vertically long rectangle as viewed from the driver D). In a state where the airbag 122 is set in the pad cover 21, the lower end of the airbag 122 is disposed, in a folded state, in the extension portion 21L of the pad cover 21. Note that no creases are present at the side of the airbag 122 to which inflation gas is supplied from the inflator 23, that is, the side of the airbag 122 on the front side of the vehicle.

Figure 24:
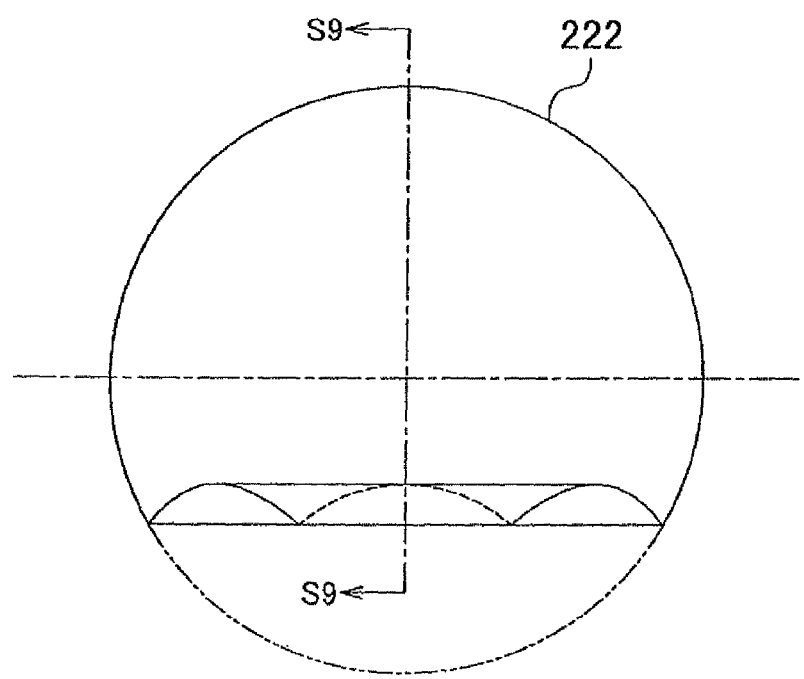
FIG. 24 is a front view of the airbag when the a substantially lower half of the airbag has been rolled toward the front side of the vehicle and the folded back toward the rear side of the vehicle.
Figure 25:
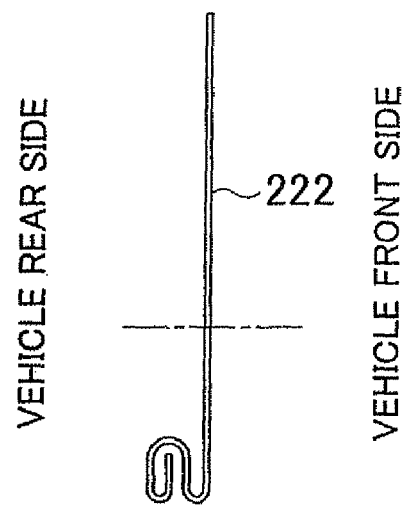
FIG. 25 is a cross-sectional view of the airbag taken along S9-S9 in FIG. 24.
Figure 26:
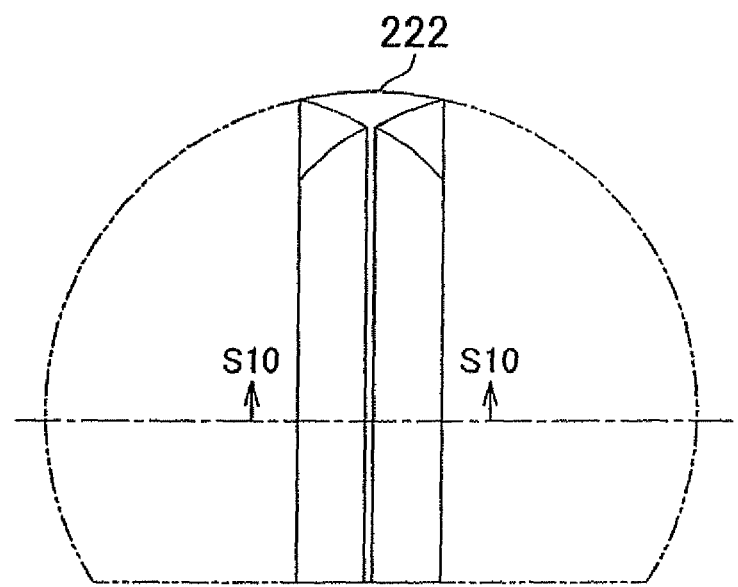
FIG. 26 is a front view of the airbag shown in FIG. 24 when the left and right portions have been rolled toward the front side of the vehicle and then folded back toward the rear side of the vehicle.
Figure 27:
FIG. 27 is a cross-sectional view of the airbag taken along S10-S10 in FIG. 26.
Figure 28:
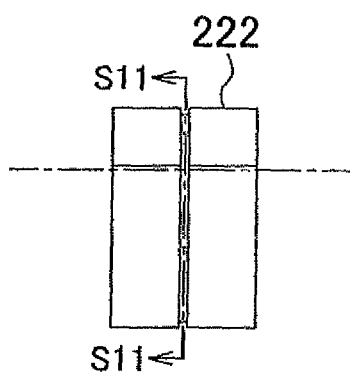
FIG. 28 is a front view of the airbag shown in FIG. 26 when the upper portion of the airbag has been rolled toward the front side of the vehicle and then folded back toward the rear side of the vehicle.
Figure 29:
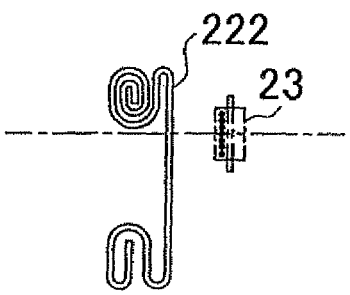
FIG. 29 is a cross-sectional view of the airbag taken along S11-S11 in FIG. 28.

FIG. 24 and FIG. 25 illustrate a state where a substantially lower half of an airbag 222 has been rolled toward the front side of the vehicle and then folded back toward the rear side of the vehicle. In this state of the airbag 222, creases are present only at the substantially lower half of the airbag 222. FIG. 26 and FIG. 27 illustrate a state where the left and right portions of the airbag 222 in the state shown in FIG. 24 have been rolled toward the front side of the vehicle and then folded back toward the rear side of the vehicle. In this state of the airbag 222, no creases are present at the side of the airbag 222 on the front side of the vehicle. FIG. 28 and FIG. 29 illustrate a state where the upper portion (the portion extending upward from the center portion) of the airbag 222 in the state shown in FIG. 26 have been rolled toward the front side of the vehicle and then folded back toward the rear side of the vehicle. In this state of the airbag 222, no creases are present at the side of the airbag 222 on the front side of the vehicle.

When the airbag 222 is in the state illustrated in FIG. 28 and FIG. 29, the lower portion of the airbag 222 extending downward from the center portion to which the inflator 23 is attached (indicated by the single-dotted line in FIG. 29) is longer, in the vertical direction, than the upper portion by a given amount (i.e., the airbag 222 appears to be a vertically long rectangle as viewed from the driver D). In a state where the airbag 222 is set in the pad cover 21, the lower portion of the airbag 222 is disposed, in a folded state, in the extension portion 21L of the pad cover 21. Note that no creases are present at the side of the airbag 222 to which inflation gas is supplied from the inflator 23, that is, the side of the airbag 222 on the front side of the vehicle.

Figure 30:
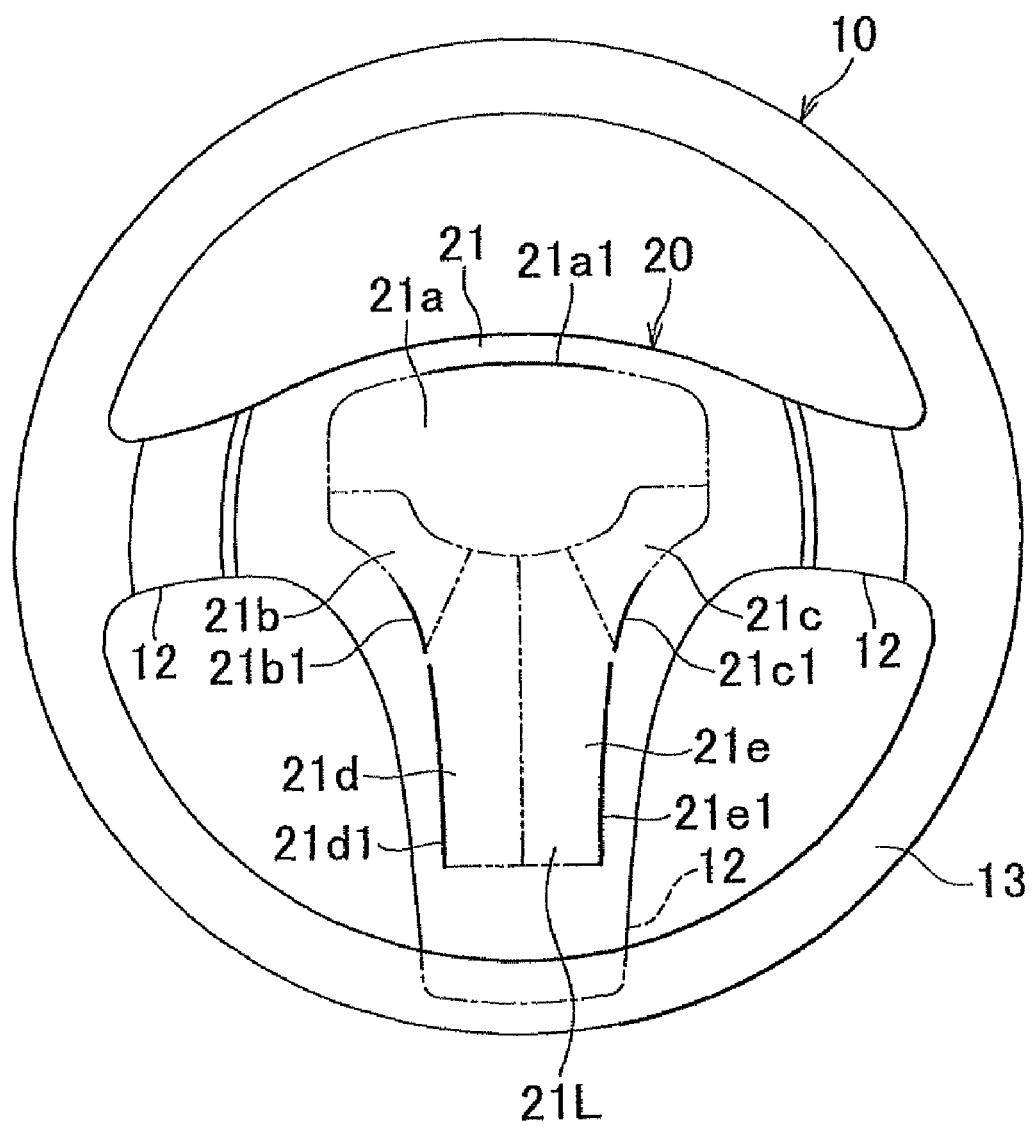
FIG. 30 is a front view of a vehicle airbag device modified from the vehicle airbag device of the first example embodiment.

According to the above-described airbag device of the first example embodiment, as shown in FIG. 2, the extension portion 21L of the pad cover 21 extends to an extent that it overlaps a portion of the rim 13 of the steering wheel 10 (a portion of the rim 13 extending a limited distance in the circumferential direction of the rim 13 and the entire distance in the radial direction of the rim 13). However, because it is sufficient that the extension portion 21L of the pad cover 21 extends to the inner periphery of the rim 13 indicated by the solid lines in FIG. 30, the rim 13 is not necessarily formed to overlap the rim 13. Note that the extension portion 21L of the pad cover 21 may alternatively be formed such that the extension portion 21L partially overlaps the rim 13 of the steering wheel 10 as indicated by the single-dotted line in FIG. 30 (i.e., overlaps a portion of the rim 13 extending a limited distance in the circumferential direction and a limited distance in the radial direction).

Figure 31:
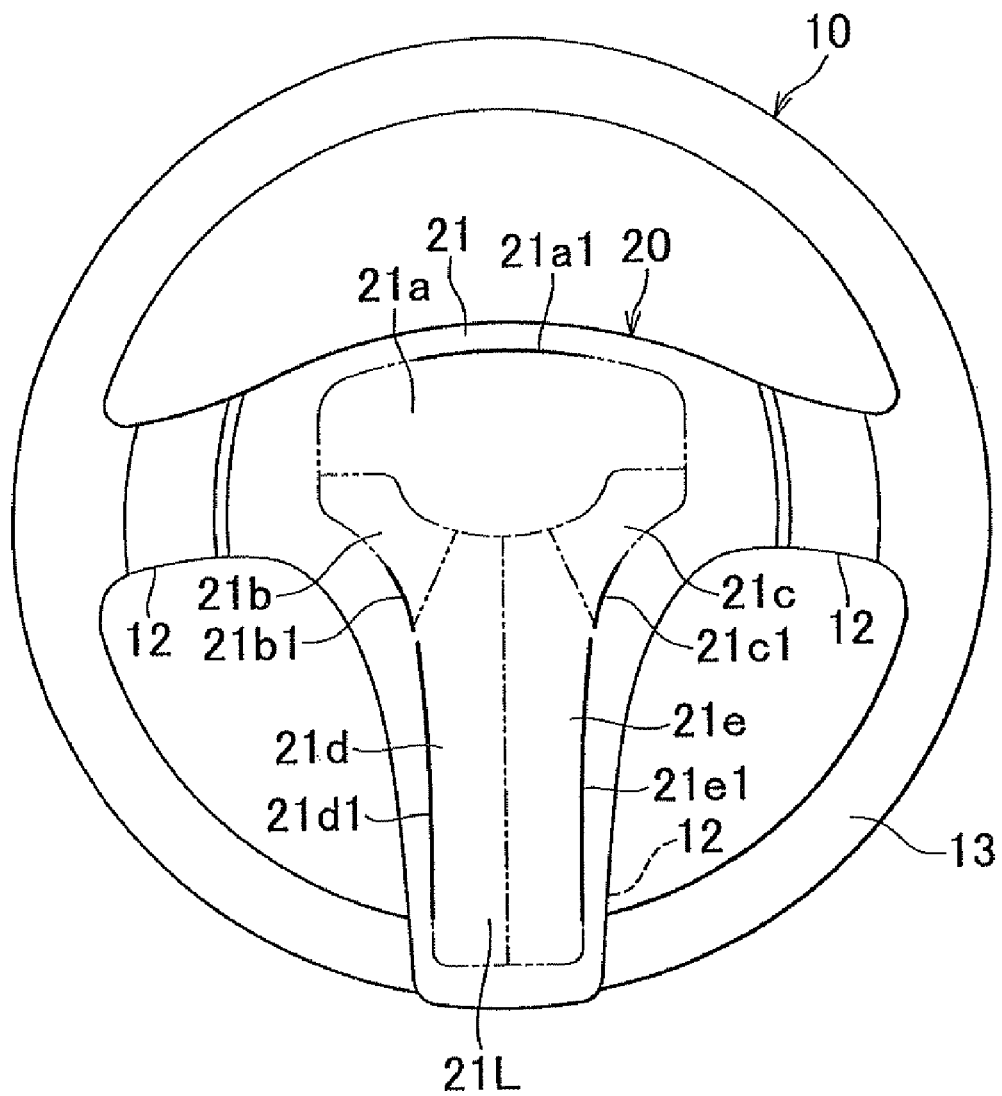
FIG. 31 is a front view of a vehicle airbag device according to the second example embodiment of the invention.

Further, while the tear portions 21d, 21e at the extension portion 21L of the pad cover 21 (that extends so as to overlap a portion of the rim 13 of the steering wheel 10) do not extend to the rim 13 in the above-described airbag device of the first example embodiment as shown in FIG. 2, the tear portions 21d, 21e of the extension portion 21L of the pad cover 21 may be formed to the rim 13 (i.e., may overlap a portion of the rim 13) as shown in FIG. 31 representing an airbag device according to the second example embodiment of the invention. In this case, in order to facilitate the lower end of the airbag 22 to deploy downward, the lower end of the pad cover 21, which faces the lower end of the airbag 22 shown in FIG. 3, may have a slope portion inclined toward the rim 13.

According to the vehicle airbag device of the second example embodiment, because the tear portions 21a, 21b, 21c, 21d, and 21e formed at the pad cover 21 deploy as shown in FIG. 32, the portion of the folded airbag 22 disposed in the extension portion 21L of the pad cover 21 deploys beyond the rim 13 and reaches a target position between the rim 13 and the driver D. Therefore, the time needed for the deployment of the airbag 22 between the rim 13 and the driver D is shorter than the vehicle airbag device of the first example embodiment.

Figure 33:
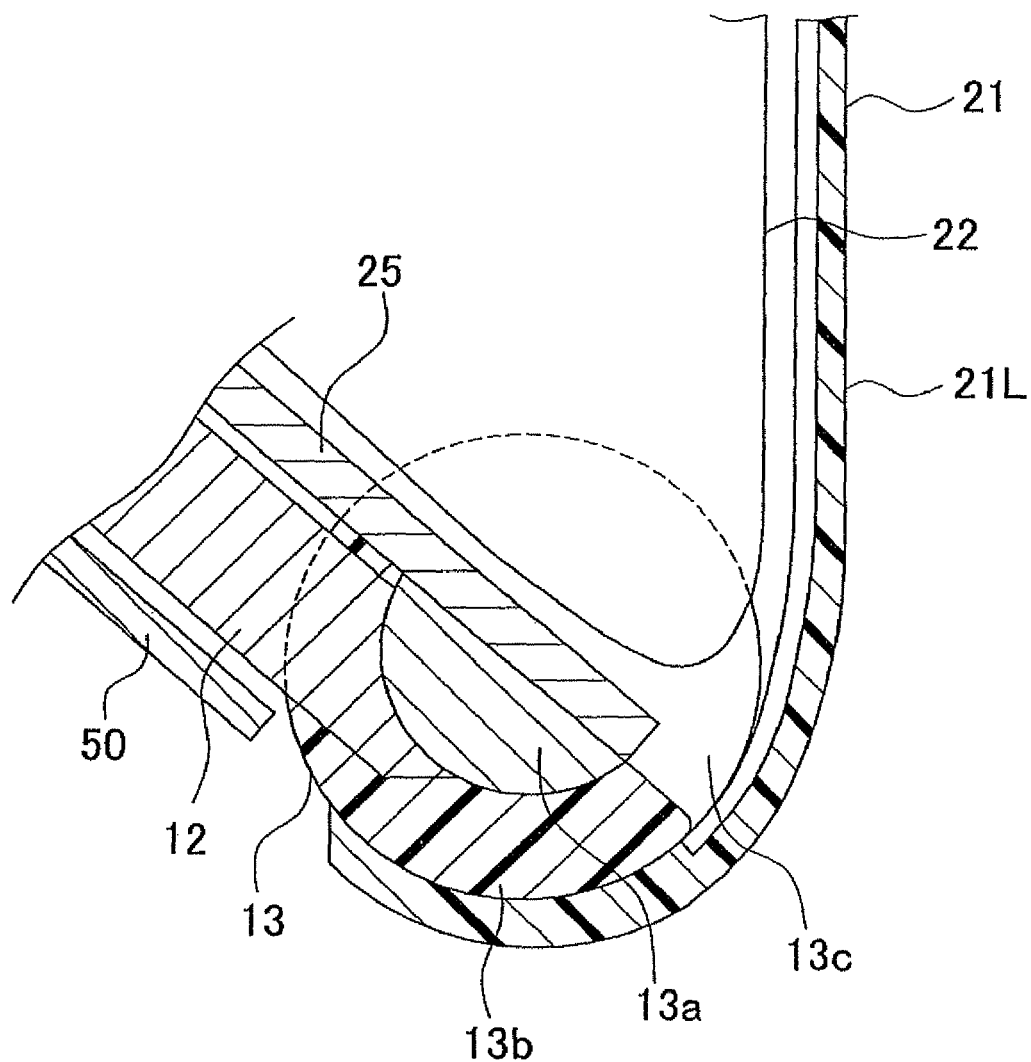
FIG. 33 is a cross-sectional view of a portion of a vehicle airbag device according to the third example embodiment of the invention.

While the vehicle airbag device of the second example embodiment has the tear portions 21d, 21e that overlap a portion of the rim 13 as shown in FIG. 31, it may additionally incorporate the structure shown in FIG. 33 indicating an airbag device according to the third example embodiment of the invention. According to the vehicle airbag device of the third example embodiment shown in FIG. 33, the extension end portion of the extension portion 21L of the pad cover 21 overlaps a portion of the rim 13, and the tear portions (21d, 21e), which tear upon collision of the vehicle, extend to this overlapping portion of the extension portion 21L, and a concave portion 13c is formed at the rim 13, and a portion of the airbag 22 is disposed in the concave portion 13c. According to the vehicle airbag device of the third example embodiment, further, the bag holder 25 extends into the concave portion 13c of the rim 13.

Figure 34:
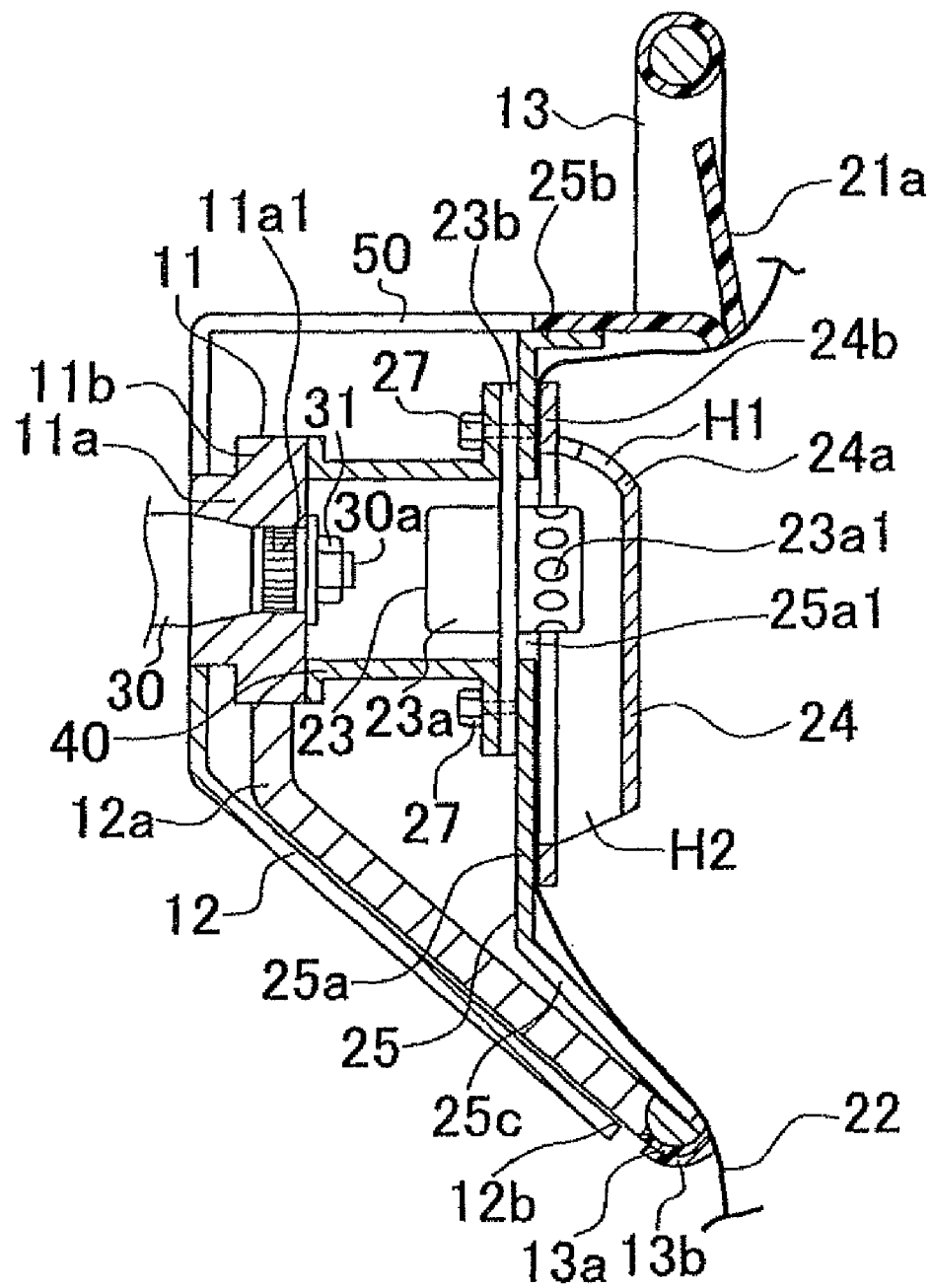
FIG. 34 is a view illustrating a state where the airbag of the vehicle airbag device of the third example embodiment shown in FIG. 33 has started deploying.

According to the vehicle airbag device of the third example embodiment, upon collision of the vehicle, the portion of the airbag 22 disposed in the concave portion 13c formed at the rim 13 deploys between the rim 13 and the driver D as shown in FIG. 34. Therefore, the distance the airbag 22 needs to travel before reaching the driver D upon its deployment is shorter than the vehicle airbag device of the second example embodiment, and thus the time needed for the deployment of the airbag 22 between the rim 13 and the driver D further decreases. According to the vehicle airbag device of the third example embodiment, further, because the bag holder 25 extends into the concave portion 13c of the rim 13, the bag holder 25 facilitates the motion of deployment of the portion of the airbag 22 disposed in the concave portion 13c between the rim 13 and the driver D.

Figure 35:
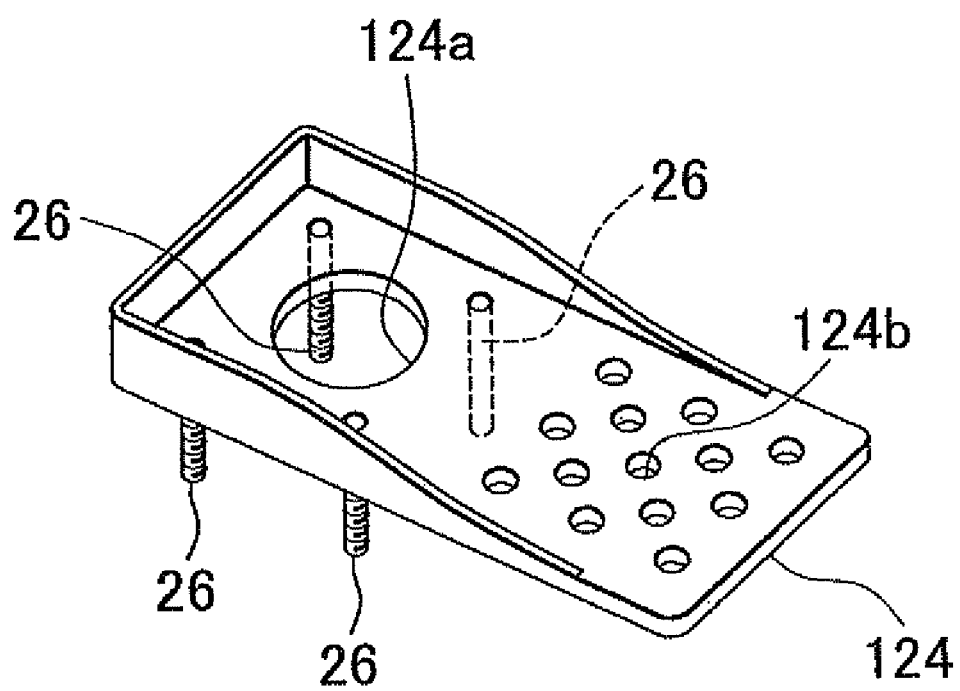
FIG. 35 is a perspective view of a bag retainer according to the fourth example embodiment of the invention, which can be used in place of the diffuser shown in FIG. 15.

While the diffuser 24 shown in FIG. 15 is set in the airbag 22 in each example embodiment of the invention, a bag retainer 124 shown in FIG. 35 may be used instead of the diffuser 24. Referring to FIG. 35, the bag retainer 124 has a through hole 124a via which the rear portion of the body 23a of the inflator 23 is inserted into the inside of the airbag 22 and a plurality of through holes 124b that are formed to reduce the weight of the bag retainer 124. The bag retainer 124 is rectangular (a portion of the bag retainer 124 extends along the spoke 12 extending from the hub 11 toward the driver D). Note that four stud bolts 26 are secured to the bag retainer 124 like the diffuser 24 described above.

According to an airbag device of the fourth example embodiment of the invention incorporating the bag retainer 124 shown in FIG. 35, the portion of the airbag 22 disposed in the extension portion 21L of the pad cover 21 is provided between the bag retainer 124 and the spokes 12 and it is thus prevented from moving unnecessarily upon deployment, and therefore the airbag 22 deploys in a stable manner. Further, the bag retainer 124 serves also as a core when folding the airbag 22, which facilitates the process for folding the airbag 22.

According to the vehicle airbag device of the fourth example embodiment, further, the bag retainer 124 maintains the shape of the folded airbag 22 until it is attached to the steering wheel 10, and this facilitates the process for assembling the folded airbag 22, the pad cover 21, and other components into an airbag module. Further, in a case where the process for folding the airbag 22 and the process for assembling the airbag module are performed at different places, the airbag 22 can be reliably prevented from being unfolded accidentally during transportation.

While no description was made of the structure for retaining the folded airbag in any of the foregoing example embodiments of the invention, the folded airbag may be retained by a package cloth 29 as shown in FIG. 36, FIG. 37, FIG. 38, and FIG. 39 illustrating an airbag device according to the fifth example embodiment of the invention. The package cloth 29 is made of a stretchable fiber material, and it tears, upon deployment of the airbag 22, along the dotted lines in FIG. 38.

Figure 38:
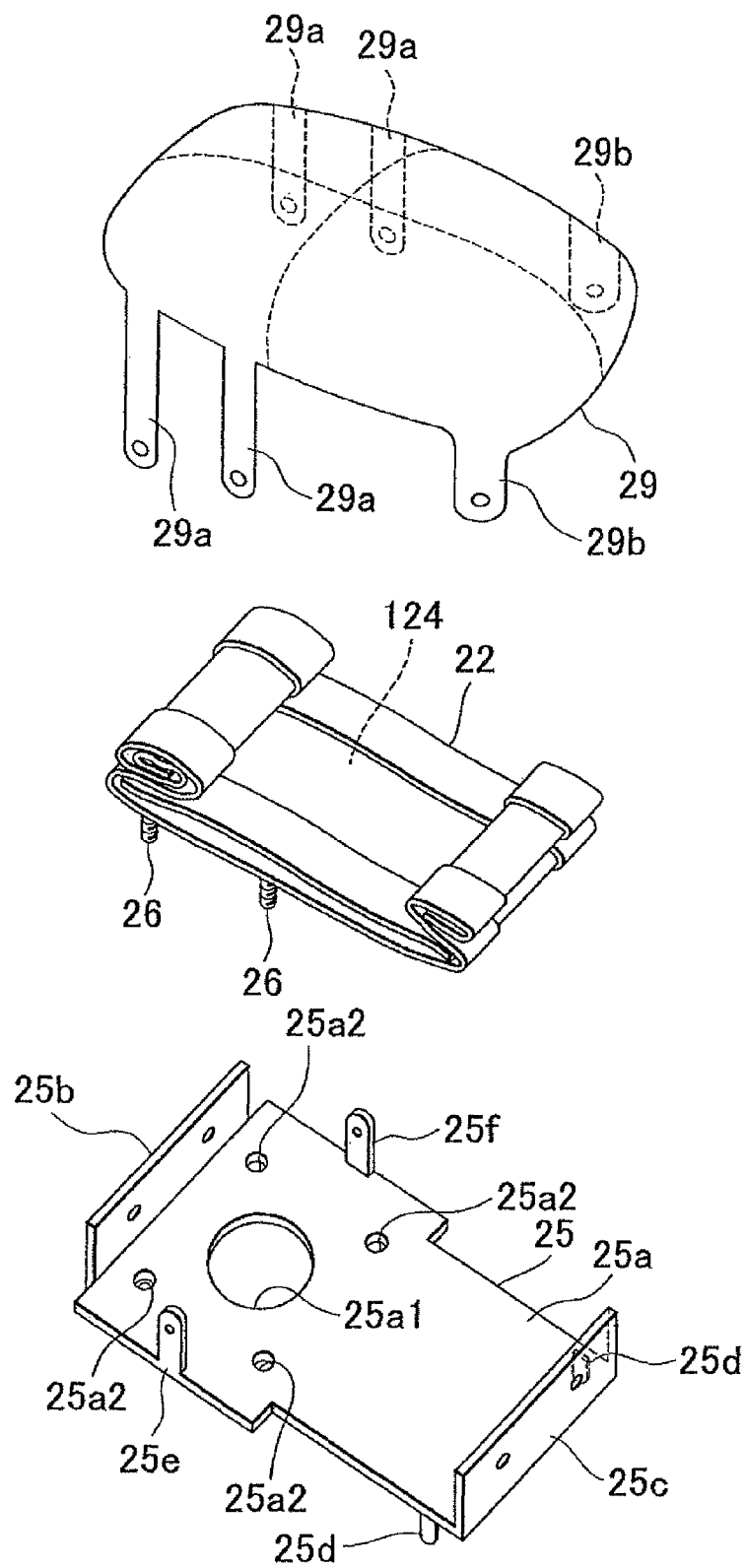
FIG. 38 is an exploded perspective view showing the components shown in FIG. 36 and FIG. 37.
Figure 39:
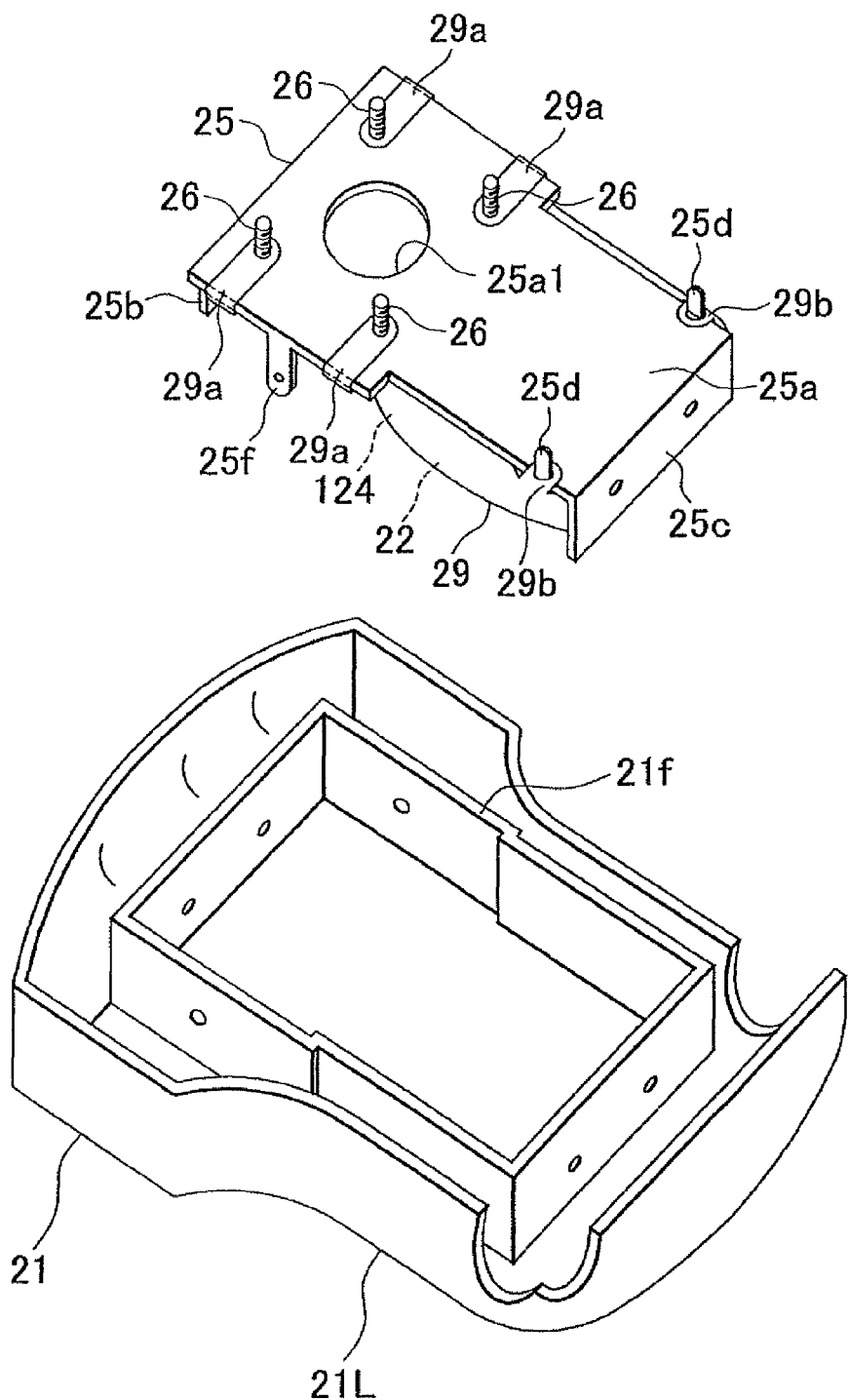
FIG. 39 is a perspective view illustrating the assembling procedure for the components shown in FIG. 36 and FIG. 37 and the pad cover.

According to the vehicle airbag device of the fifth example embodiment of the invention, the bag retainer 124 (or the diffuser 24) is set in the airbag 22 in advance, and the airbag 22 is folded as shown in FIG. 38 through the processes illustrated in FIG. 4 to FIG. 13. Then, the airbag 22 folded as shown in FIG. 38 is then put on the bag holder 25, and the package cloth 29 is attached to it, whereby a sub-assembly constituted of the airbag 22, the bag holder 25, and other components is produced. The package cloth 29 is attached by hooking attachment portions 29a over the respective stud bolts 26 and hooking attachment portions 29b over projections 25b provided on the bag holder 25.

Figure 36:
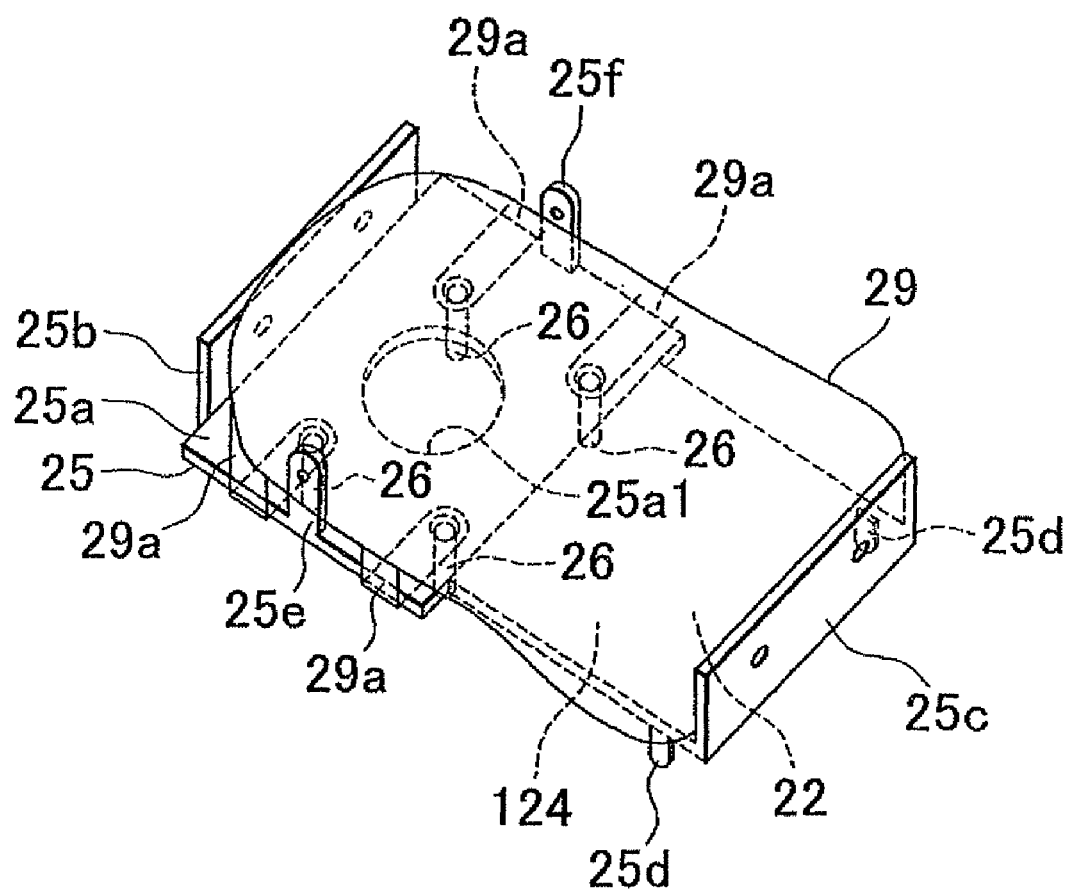
FIG. 36 is a perspective view of a pad sub-assembly according to the fifth example embodiment of the invention, which is constituted of a folded airbag, a bag holder, and other components, joined together using a package cloth.
Figure 37:
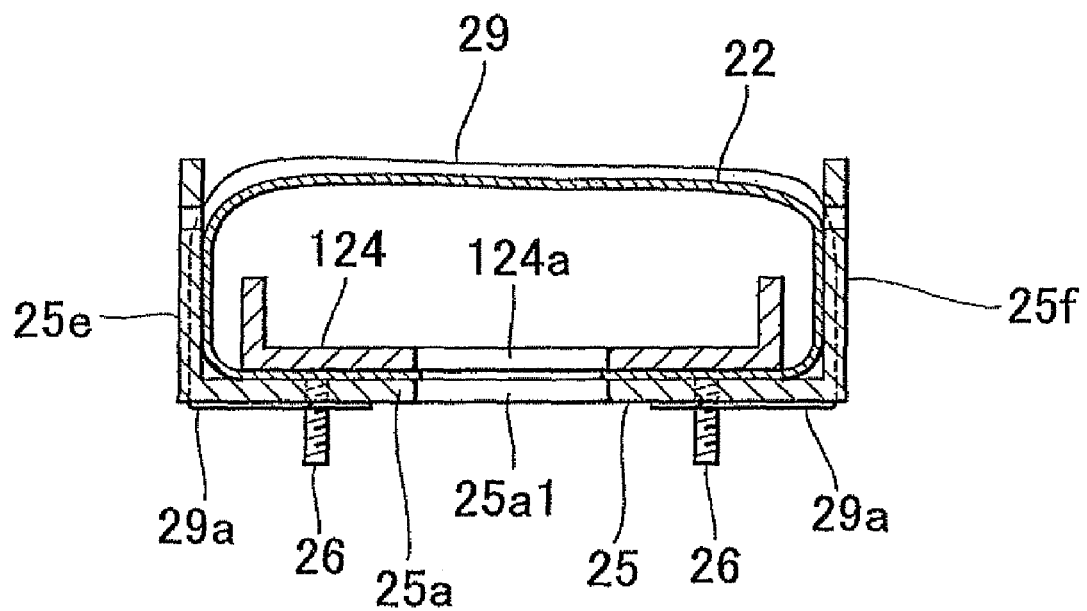
FIG. 37 is a cross-sectional view cutting vertically through the bent portions of the bag holder of the pad sub-assembly shown in FIG. 36.

The sub-assembly produced by assembling the airbag 22, the bag holder 25, and other components as illustrated in FIG. 36 and FIG. 37 is then turned upside down and then mounted in a mount portion 21f of the pad cover 21 and then fixed via the bent portions 25b, 25c, 25e, and 25f using given connecting means, such as rivets (not shown in the drawings). This is how the airbag module is assembled.

According to the above-described airbag device of the fifth example embodiment, the folded airbag 22, the bag holder 25, and other components are assembled into a sub-assembly, and the folded airbag is retained on the flat portion 25a of the bag holder 25 between the bent portions 25b, 25c, 25; and 25f of the bag holder 25. Thus, the bag holder 25 maintains the shape of the airbag 22, and this facilitates the process for assembling the folded airbag 22, the pad cover 21, and other components into an airbag module. Further, in a case where the process for assembling the sub-assembly by folding the airbag 22 and the process for assembling the airbag module are performed at different places, the airbag 22 can be reliably prevented from being unfolded accidentally during transportation.

While the steering wheel 10 has three spokes 12 and the rim 13 is circular in the foregoing example embodiments of the invention, the number of the spokes 12 (at least one spoke) and the shape of the rim 13 may be changed as needed.

The invention claimed is:

1. A vehicle airbag device, comprising:
 a pad cover that is provided at the center of a steering wheel constituted of a spoke, a rim, and a hub to which the rim is connected via the spoke, and that is secured to the hub or to the spoke;
 an airbag that is provided, in a folded state, at the pad cover, and that deploys upon collision of the vehicle by tearing the pad cover and restrains a vehicle occupant, and
 an inflator that is secured to the hub or to the spoke and supplies inflation gas into the airbag upon collision of the vehicle, wherein:
 the pad cover has an extension portion extending from the center of the steering wheel to the rim of the steering wheel such that the extension portion overlaps the spoke;
 the extension portion of the pad cover has a tear portion that tears upon collision of the vehicle;
 a portion of the airbag is disposed, in a folded state, at the extension portion of the pad cover;

the extension portion of the pad cover overlaps a portion of the rim of the steering wheel;

the tear portion at the extension portion extends to where the extension portion overlaps the rim; and a concave portion is formed at the rim of the steering wheel and a portion of the airbag is disposed in the concave portion.

2. The vehicle airbag device according to claim 1, wherein:

the inflator is attached to a center portion of the airbag; and the airbag is folded and installed in the pad cover such that a lower portion of the folded airbag that extends downward from the center portion of the folded airbag is longer by a predetermined amount than an upper portion of the folded airbag that extends upward from the center portion of the folded airbag.

3. The vehicle airbag device according to claim 1, further comprising:

a diffuser that is provided in the airbag so as to guide a part of the inflation gas supplied from the inflator to the portion of the airbag disposed at the extension portion of the pad cover.

4. The vehicle airbag device according to claim 1, wherein the airbag is folded such that no creases are formed at a side of the airbag to which the inflation gas is supplied from the inflator, and a portion of the crease-free portion of the airbag is disposed at the extension portion of the pad cover.

5. The vehicle airbag device according to claim 4, wherein the airbag is folded by rolling right and left portions of the airbag toward the front side of the vehicle and then folding the rolled right portion and left portions of the airbag back toward the rear side of the vehicle such that a lower portion of the airbag that extends downward from the center portion at which the inflator is provided is longer by a predetermined amount than an upper portion of the airbag that extends upward from the center portion, and then the airbag is disposed in the pad cover.

6. The vehicle airbag device according to claim 1, further comprising:

a bag retainer that is arranged such that a portion of the airbag is sandwiched between the bag retainer and the inflator, wherein a portion of the bag retainer extends from the center of the steering wheel to the rim along the spoke.

7. The vehicle airbag device according to claim 1, further comprising:

a bag holder that is provided outside of the airbag and on the vehicle front side of the air bag so as to hold the air bag, wherein a portion of the bag holder extends from the center of the steering wheel to the rim.

8. The vehicle airbag device according to claim 1, wherein the extension portion of the pad cover extends such that the extension portion overlaps the spoke extending toward a portion of the rim that is close to the vehicle occupant.

* * * * *